(12) United States Patent
Koike

(10) Patent No.: US 9,210,290 B2
(45) Date of Patent: Dec. 8, 2015

(54) DESTINATION SETTING APPARATUS, CONTROL METHOD, AND RECORDING MEDIUM

(75) Inventor: Hiroaki Koike, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1166 days.

(21) Appl. No.: 12/634,298

(22) Filed: Dec. 9, 2009

(65) Prior Publication Data

US 2010/0171981 A1   Jul. 8, 2010

(30) Foreign Application Priority Data

Jan. 8, 2009   (JP) ................. 2009-002915

(51) Int. Cl.
 *G06F 15/00* (2006.01)
 *H04N 1/32* (2006.01)

(52) U.S. Cl.
 CPC .... *H04N 1/32122* (2013.01); *H04N 2201/3208* (2013.01); *H04N 2201/3212* (2013.01); *H04N 2201/3273* (2013.01)

(58) Field of Classification Search
 None
 See application file for complete search history.

(56) References Cited

U.S. PATENT DOCUMENTS

| | | | | |
|---|---|---|---|---|
| 5,946,104 A * | 8/1999 | Yoshida | ........................ | 358/412 |
| 6,046,825 A * | 4/2000 | Yoshida | ........................ | 358/434 |
| 6,434,097 B1 * | 8/2002 | Lewis et al. | ................ | 369/47.11 |
| 7,014,374 B2 * | 3/2006 | Hamaguchi et al. | ............ | 400/62 |
| 7,031,033 B2 * | 4/2006 | Asahi | ........................ | 358/479 |
| 7,587,460 B2 * | 9/2009 | Saito | ............................ | 709/207 |
| 7,895,269 B2 * | 2/2011 | Ikeda | ............................ | 709/204 |
| 8,049,916 B2 * | 11/2011 | Tabuki | ........................ | 358/1.15 |
| 2004/0218209 A1 * | 11/2004 | Hamaguchi et al. | ......... | 358/1.15 |

FOREIGN PATENT DOCUMENTS

JP   2004-364218 A   12/2004

* cited by examiner

*Primary Examiner* — Ashish K Thomas
(74) *Attorney, Agent, or Firm* — Fitzpatrick, Cella, Harper & Scinto

(57) ABSTRACT

The present invention provides a destination setting apparatus for setting destinations used in communications based on a plurality of communication protocols, the apparatus including an input unit configured to input destination information including a destination and a communication protocol of the destination to a destination list which displays a destination as a communication target, a display unit configured to display a setting screen including setting items settable by each communication protocol, based on the destination information input to the destination list, a determination unit configured to determine if the destination information input to the destination list includes one type of communication protocol or a plurality of different types of communication protocols, and a control unit configured to control to generate a setting screen to be displayed by the display unit based on the determination result of the determination unit, and to display the setting screen on the display unit.

13 Claims, 21 Drawing Sheets

F I G. 4

| TYPE OF COMMUNICATION PROTOCOL | SETTABLE SETTING ITEM |
|---|---|
| E-MAIL | FILE FORMAT, TRANSMISSION DOCUMENT NAME, TITLE, BODY TEXT, RETURN DESTINATION, E-MAIL IMPORTANCE, ... |
| FAX | SENDER NAME ... |
| I-FAX | TRANSMISSION DOCUMENT NAME, TITLE, BODY TEXT, RETURN DESTINATION ... |
| FILE | FILE FORMAT, TRANSMISSION DOCUMENT NAME ... |

DESTINATION SETTING APPARATUS, CONTROL METHOD, AND RECORDING MEDIUM

BACKGROUND OF THE INVENTION

1. Field of the Invention

The present invention relates to a destination setting apparatus which sets destinations used in communications based on a plurality of communication protocols, a control method, and a recording medium.

2. Description of the Related Art

In recent years, communication apparatuses which can make communications based on a plurality of communication protocols such as facsimile (FAX), e-mail, and Internet facsimile (I-FAX) have prevailed. In such apparatuses, a technique for displaying a setting screen of additional information (setting information) corresponding to a selected communication protocol, and performing communication with a partner (destination) based on the additional information set on that setting screen has been proposed by Japanese Patent Laid-Open No. 2004-364218.

Japanese Patent Laid-Open No. 2004-364218 describes that upon selection of a certain communication protocol from a plurality of communication protocols, a setting screen corresponding to that communication protocol is displayed. However, Japanese Patent Laid-Open No. 2004-364218 does not mention about selection of a plurality of different communication protocols. Therefore, Japanese Patent Laid-Open No. 2004-364218 does not include any description about display (control) of a setting screen upon selection of a plurality of different types of communication protocols.

That is, with the technique described in Japanese Patent Laid-Open No. 2004-364218, the user has to select a communication protocol one by one to display a corresponding setting screen used in settings, resulting in troublesome operations.

Japanese Patent Laid-Open No. 2004-364218 does not include any description about display of the relations between setting items on the setting screens and communication protocols (that is, which of setting items influences which of communication protocols).

For this reason, it is difficult for the user to understand the relations between the setting items and communication protocols, resulting in poor usability.

SUMMARY OF THE INVENTION

The present invention provides a novel technique associated with display (control) of a setting screen upon selection of a plurality of different types of communication protocols.

According to one aspect of the present invention, there is provided a destination setting apparatus for setting destinations used in communications based on a plurality of communication protocols, the apparatus comprising: an input unit configured to input destination information including a destination and a communication protocol of the destination to a destination list which displays a destination as a communication target; a display unit configured to display a setting screen including setting items settable by each communication protocol, based on the destination information input to the destination list; a determination unit configured to determine if the destination information input to the destination list includes one type of communication protocol or a plurality of different types of communication protocols; and a control unit configured to control to generate a setting screen to be displayed by the display unit based on the determination result of the determination unit, and to display the setting screen on the display unit, wherein when the determination unit determines that the destination information input to the destination list includes one type of communication protocol, the control unit generates a setting screen including setting items settable by the one type of communication protocol, and when the determination unit determines that the destination information input to the destination list includes a plurality of different types of communication protocols, the control unit generates a setting screen including setting items obtained by merging setting items settable by the plurality of different types of communication protocols.

Further aspects of the present invention will become apparent from the following description of exemplary embodiments with reference to the attached drawings.

BRIEF DESCRIPTION OF THE DRAWINGS

FIG. 4 is a view showing an example of a database showing the relationship between (types of) communication protocols and setting items settable by these communication protocols.

DESCRIPTION OF THE EMBODIMENTS

Figure 1:
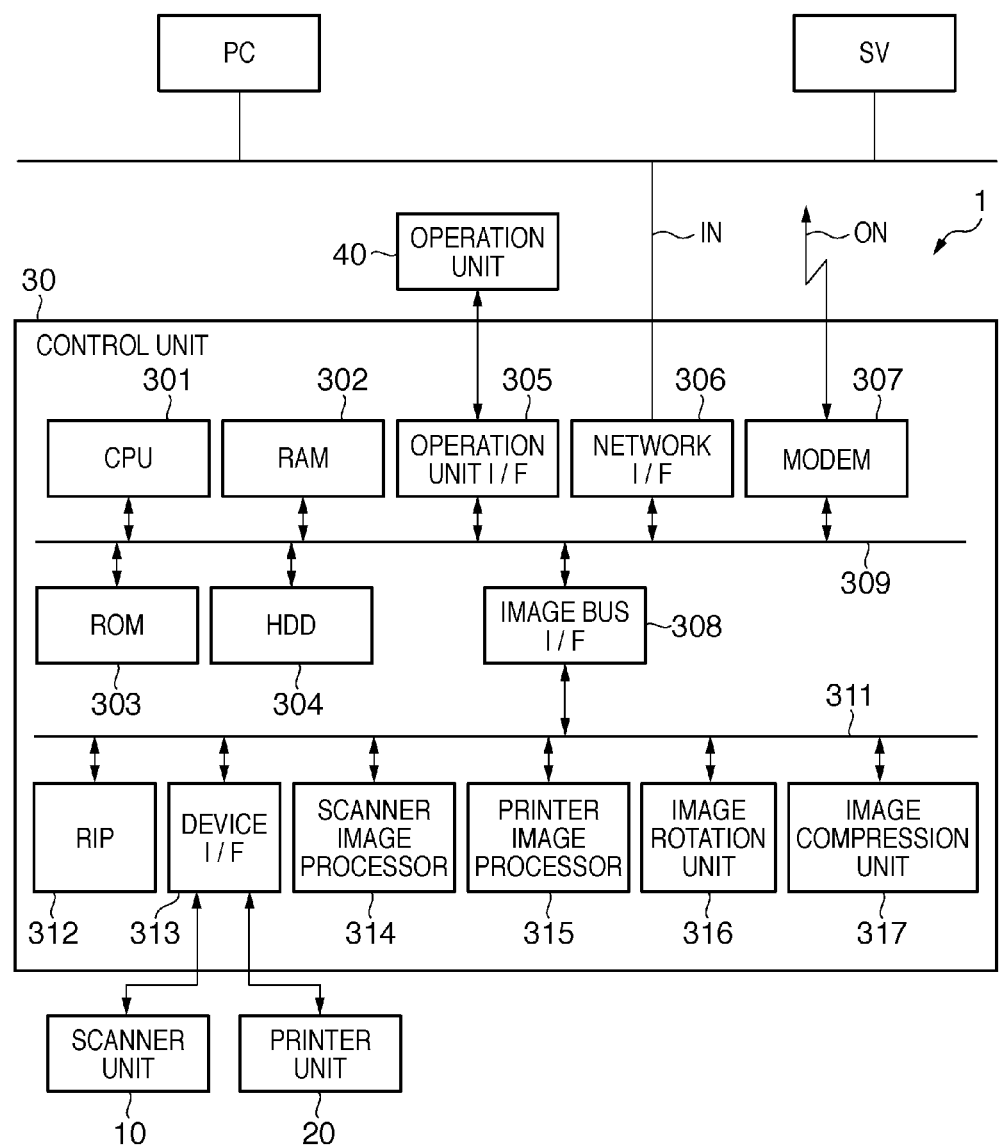
FIG. 1 is a schematic block diagram showing the arrangement of a system including a communication apparatus which comprises a destination setting apparatus according to one aspect of the present invention.

Preferred embodiments of the present invention will be described below with reference to the accompanying drawings. Note that the same reference numerals denote the same members throughout the drawings, and a repetitive description thereof will not be given.

FIG. 1 is a schematic block diagram showing the arrangement of a system including a communication apparatus 1 which comprises a destination setting apparatus according to one aspect of the present invention. The communication apparatus 1 is a multi-functional peripheral equipment having a copy function, print function, and the like. The communication apparatus 1 can make communications based on a plurality of communication protocols (for example, facsimile (FAX), e-mail, and Internet facsimile (I-FAX)) (that is, the apparatus 1 has a communication function that allows to make communications based on the plurality of communication protocols).

The communication apparatus 1 includes a scanner unit 10 as an image input device, a printer unit 20 as an image output device, a control unit 30, and an operation unit 40, as shown in FIG. 1. Note that the communication apparatus 1 is connected to internal apparatuses including an information processing apparatus and image forming apparatus (e.g., a personal computer PC and server SV) via an internal network IN such as a LAN to be able to communicate with these apparatuses. Also, the communication apparatus 1 is connected to external apparatuses including an information processing apparatus and image forming apparatus via an external network ON such as a WAN to be able to communicate with these apparatuses.

The communication apparatus 1 implements the copy function by, for example, printing an image scanned by the scanner unit 10 using the printer unit 20 (to form an image on a print sheet). The communication apparatus 1 implements the print function by printing an image corresponding to image data supplied via the internal network IN or external network ON using the printer unit 20. Furthermore, the communication apparatus 1 implements various communication functions via the internal network IN and external network ON.

The control unit 30 controls the overall (operations of) communication apparatus 1. For example, in this embodiment, the control unit 30 controls display of a setting screen on the operation unit 40. For example, the control unit 30 determines a communication protocol included in destination information input to a destination list, generates a setting screen to be displayed on the operation unit 40 based on the determination result, and displays that screen on the operation unit 40, as will be described later. Also, the control unit 30 controls display of destination information input to the destination list, as will be described later.

A CPU 301, RAM 302, ROM 303, hard disk 304, operation unit interface (I/F) 305, network I/F 306, modem 307, and image bus I/F 308 are connected via a system bus 309.

The CPU 301 reads out programs (various programs including control programs) stored in the hard disk (HDD) 304, and executes predetermined processing using the RAM 302 as a work area. For example, the CPU 301 systematically controls accesses to respective units connected to the system bus 309 based on the control programs.

The ROM 303 stores a boot program and the like. The HDD 304 stores various programs, image data, and the like.

The operation unit I/F 305 is an interface with the operation unit 40. The operation unit I/F 305 transmits image data corresponding to an image to be displayed on the operation unit 40 to the operation unit 40, receives signals generated by user's operations (inputs) on the operation unit 40, and transmits these signals to the CPU 301.

The network I/F 306 is connected to the internal network IN. The network I/F 306 inputs and outputs data and information via the internal network IN.

The modem 307 is connected to the external network ON. The modem 307 inputs and outputs data and information via the external network ON.

The image bus I/F 308 includes a bus bridge which connects the system bus 309 and an image bus 311 to convert data structures.

The image bus 311 includes a PCI bus which can transfer image data at high speed or a bus compliant with the IEEE1394 specification. To the image bus 311, a raster image processor (RIP) 312, device interface (I/F) 313, scanner image processor 314, printer image processor 315, image rotation unit 316, and image compression unit 317 are connected.

The RIP 312 rasterizes PDL code data to bitmap image data.

The device I/F 313 connects the scanner unit 10 as an image input device and the printer unit 20 as an image output device to the control unit 30 to convert a synchronous system/asynchronous system of image data. Image data scanned by the scanner unit 10 is input to the control unit 30 via the device I/F 313 and undergoes predetermined processing. The image data that has undergone the predetermined processing is output to the printer unit 20 via the device I/F 313, and is printed.

The scanner image processor 314 applies correction processing, modification processing, edit processing, and the like to image data input from the scanner unit 10.

The printer image processor 315 applies correction processing, resolution conversion processing, and the like to image data to be printed (output) by the printer unit 20.

The image rotation unit 316 executes rotation processing of image data.

The image compression unit 317 applies JPEG compression/decompression processing to multi-valued image data and JBIG, MMR, or MH compression/decompression processing to binary image data.

The operation unit 40 includes a display unit which displays the current setting state of each function associated with image formation of the communication apparatus 1, a setting screen used to input setting information in each function, and the like, and an input unit which includes keys used to input setting information in each function.

The processing of the control unit 30 in the communication apparatus 1 and, especially, processing for controlling display of a setting screen and the like on the operation unit 40 will be described below.

<First Embodiment>

The first embodiment will explain processing for displaying a setting screen including setting items settable by a communication protocol based on destination information input to a destination list which displays destinations as communication targets (i.e., targets to which data is to be transmitted from the communication apparatus 1). This processing is executed when the CPU 301 systematically controls the respective units of the communication apparatus 1, as described above. Note that the destination information includes a destination and a communication protocol of that destination in this embodiment.

Figure 2:
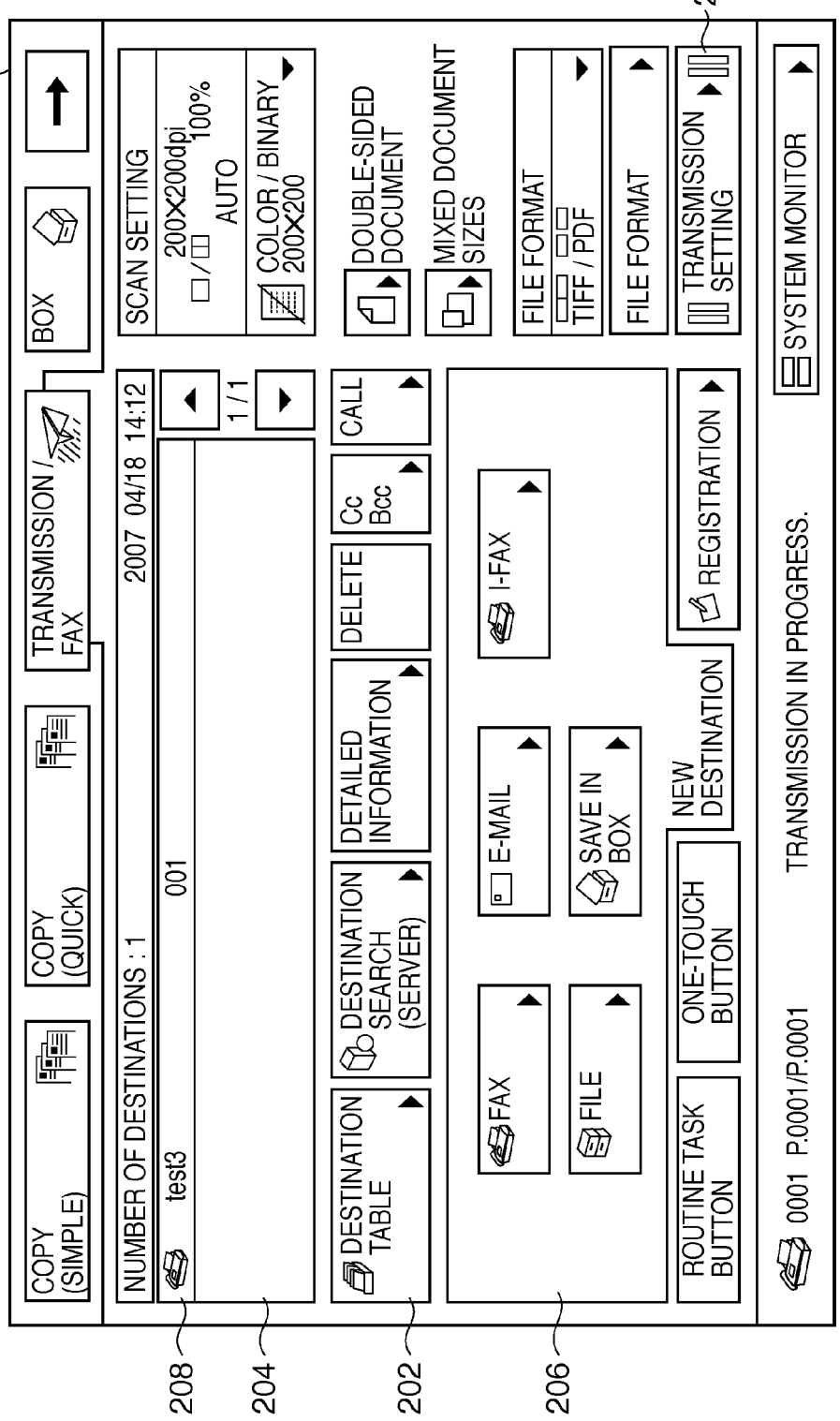
FIG. 2 is a view showing an example of a setting screen used to set (a destination as) a communication target of the communication apparatus shown in FIG. 1.

FIG. 2 is a view showing an example of a setting screen 200 used to set (a destination as) a communication target of the communication apparatus 1. The setting screen 200 is displayed on the operation unit 40.

Referring to FIG. 2, a destination table 202 has a plurality of pieces of destination information which are registered in advance, and destination information selected from the destination table 202 is input to (displayed on) a destination list 204. Note that when the user wants to input destination information which is not registered in the destination table 202, he or she can use a new destination input field 206. The new destination input field 206 allows the user to input new destination information including a destination and a communication protocol of that destination to the destination list 204. On the setting screen 200 shown in FIG. 2, destination information 208 which includes "test3" as a destination and "I-FAX" as a communication protocol is input to the destination list 204.

Figure 3:
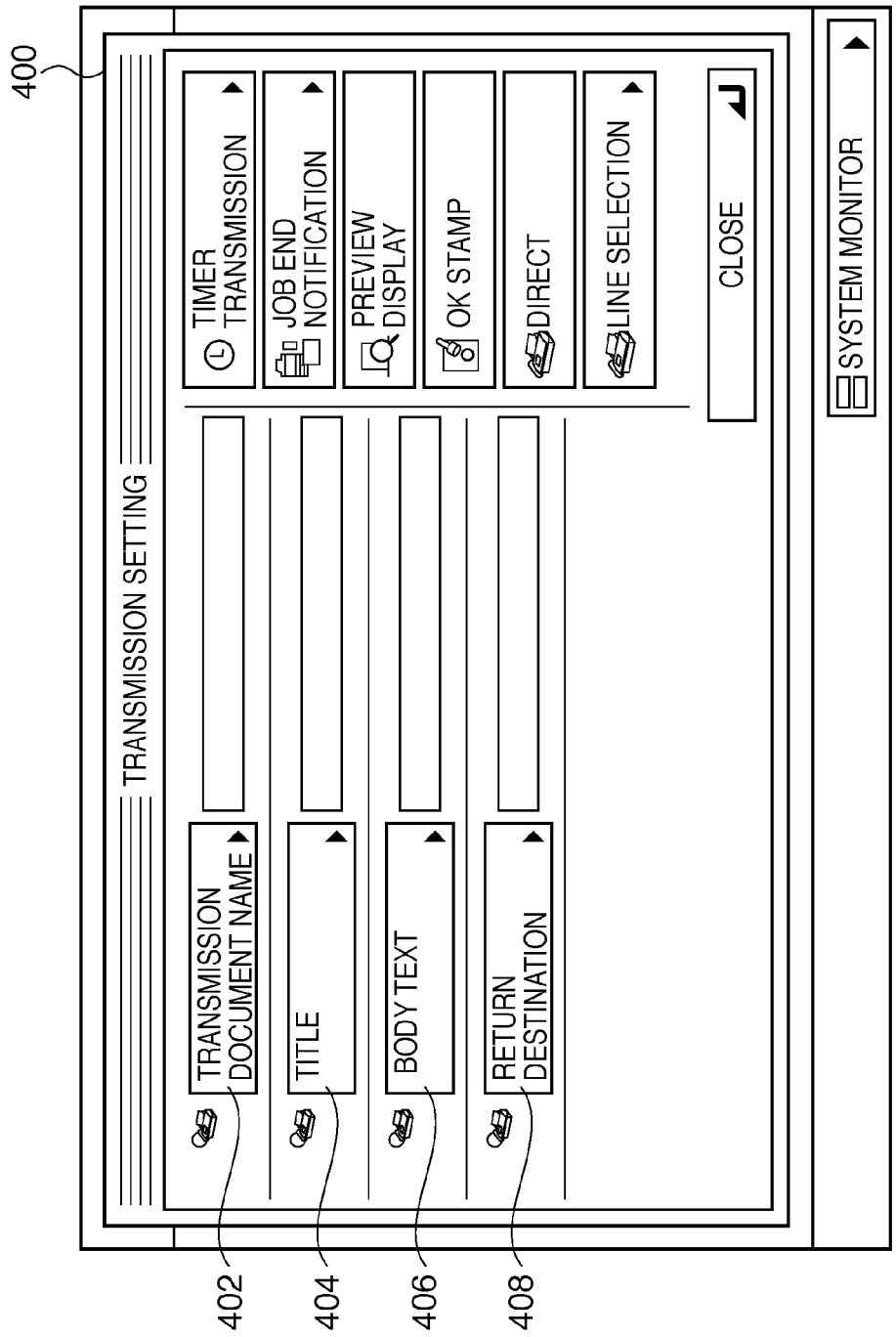
FIG. 3 is a view showing an example of a setting screen including setting items settable by a communication protocol.

When the user presses (selects) a transmission setting button 210 on the setting screen 200 shown in FIG. 2, a setting screen 400 of setting items used at the time of transmission is displayed on the operation unit 40, as shown in FIG. 3. For example, when the user presses the transmission setting button 210 while one destination information is input to the destination list 204, the setting screen 400 which includes setting items settable by the communication protocol included in the destination information input to the destination list 204 is generated. Note that FIG. 3 is a view showing an example of the setting screen 400 including setting items settable by a communication protocol.

More specifically, a case will be examined below wherein the user presses the transmission setting button 210 while the destination information 208 which includes "test3" as a destination and "I-FAX" as a communication protocol is input to the destination list 204, as shown in FIG. 2. In this case, as shown in FIG. 3, the setting screen 400 which includes a transmission document name 402, title 404, body text 406, and return destination 408 as setting items settable by the "I-FAX" communication protocol is generated, and is displayed on the operation unit 40. In this way, the setting screen 400 includes only the setting items (transmission document name 402, title 404, body text 406, and return destination 408) which are settable by the "I-FAX" communication protocol (a communication protocol of a type included in the destination information 208 input to the destination list 204).

Note that a database which indicates the relationship between the (types of) communication protocols and setting items settable by these communication protocols, as shown in FIG. 4, is stored in advance in the RAM 302 or HDD 304 of the control unit 30. Therefore, the CPU 301 extracts the type of communication protocol from the destination information 208 input to the destination list 204, and can decide setting items to be included in the setting screen 400 with reference to the database shown in FIG. 4. Note that FIG. 4 is a view showing an example of the database which indicates the relationship between the (types of) communication protocols and setting items settable by these communication protocols.

Figure 5:
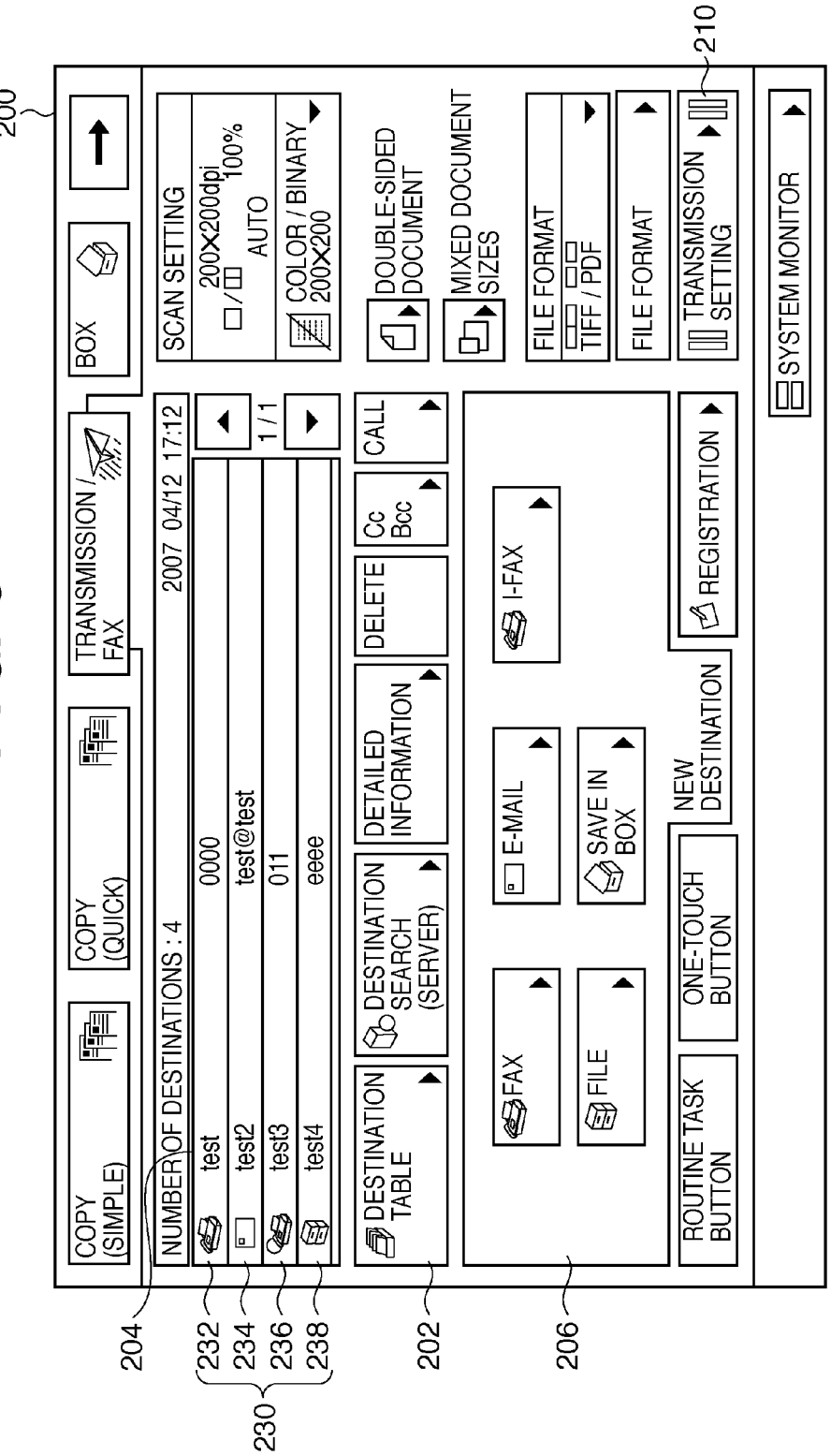
FIG. 5 is a view showing an example of a setting screen used to set (a destination as) a communication target of the communication apparatus shown in FIG. 1.

A case will be examined below wherein the user presses the transmission setting button 210 while a plurality of pieces of destination information 230 including all communication protocols, based on which the communication apparatus 1 can make communications, are input to the destination list 204 via the destination table 202 and/or new destination input field 206, as shown in FIG. 5. More specifically, the plurality of pieces of destination information 230 include destination information 232 which includes "test" as a destination and "FAX" as a communication protocol, and destination information 234 which includes "test2" as a destination and "e-mail" as a communication protocol. Furthermore, the plurality of pieces of destination information 230 include destination information 236 which includes "test3" as a destination and "I-FAX" as a communication protocol, and destination information 238 which includes "test4" as a destination and "file" as a communication protocol. Note that FIG. 5 is a view showing an example of the setting screen 200 used to set (a destination as) a communication target of the communication apparatus 1.

Figure 6:
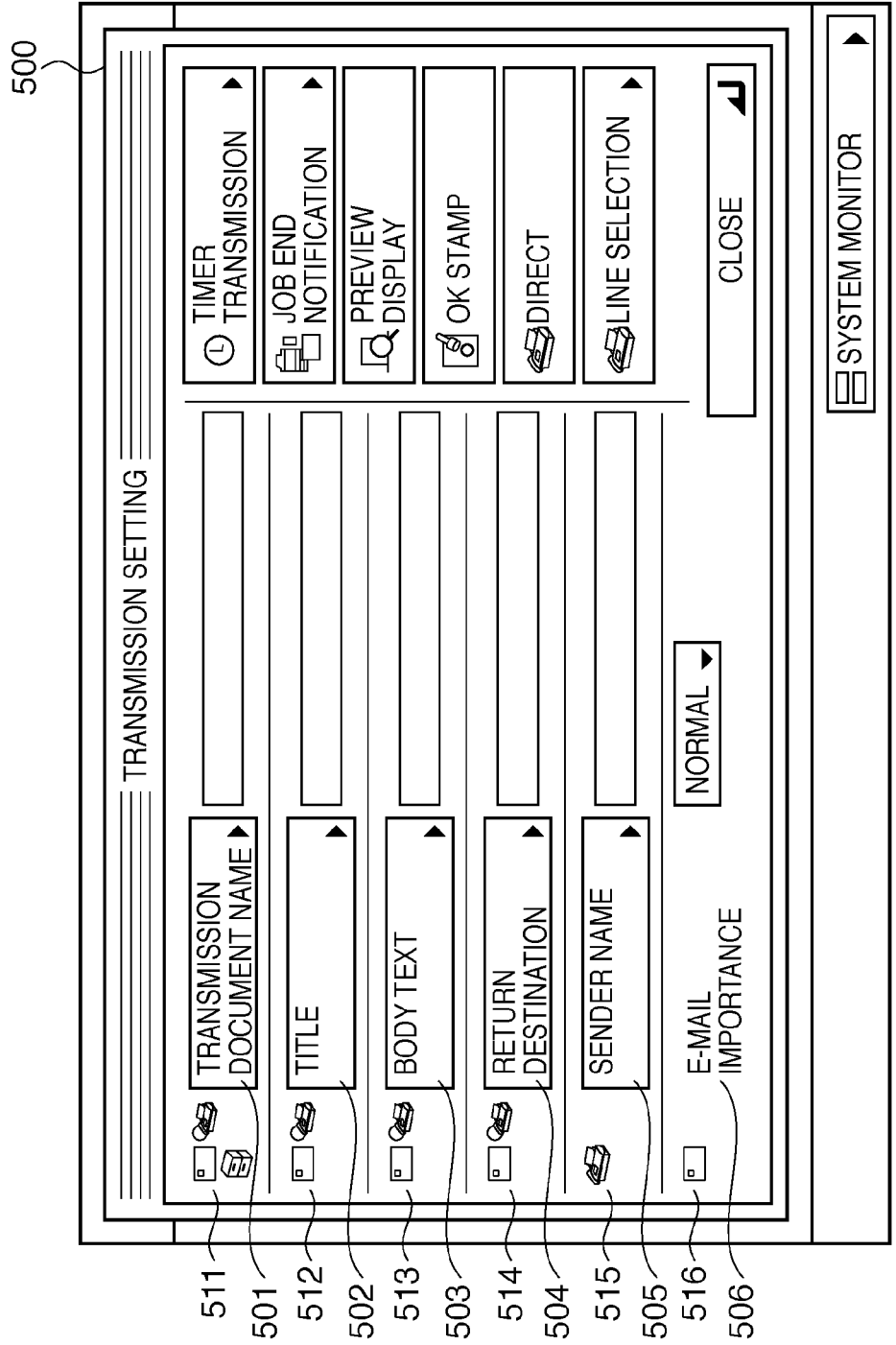
FIG. 6 is a view showing an example of a setting screen including setting items settable by a communication protocol.

In this case, a setting screen 500 including setting items obtained by merging those which are settable by all the communication protocols included in the plurality of pieces of destination information 230 is generated, and is displayed on the operation unit 40, as shown in FIG. 6. The setting screen 500 includes a transmission document name 501, title 502, and body text 503 as setting items obtained by merging those which are settable by the "FAX", "e-mail", "I-FAX", and "file" communication protocols. Furthermore, the setting screen 500 includes a return destination 504, sender name 505, and e-mail importance 506 as setting items obtained by merging those which are settable by the "FAX", "e-mail", "I-FAX", and "file" communication protocols. Also, the setting screen 500 includes identifiers 511 to 516 used to identify the relations between each of the plurality of communication protocols ("FAX", "e-mail", "I-FAX", and "file") and the setting items. For example, the identifier 511 identifies that the setting item of the transmission document name 501 relates to the "e-mail", "I-FAX", and "file" communication protocols (i.e., this setting item is settable by these communication protocols). The identifiers 512, 513, and 514 identify that the setting items of the title 502, body text 503, and return destination 504 relate to the "e-mail" and "I-FAX" communication protocols. The identifier 515 identifies that the setting item of the sender name 505 relates to the "FAX" communication protocol. The identifier 516 identifies that the setting item of the e-mail importance 506 relates to the "e-mail" communication protocol. Note that the identifiers 511 to 516 are icons which respectively express the plurality of communication protocols in this embodiment. However, these identifiers 511 to 516 may have any other forms as long as the relations between each of the plurality of communication protocols and the setting items can be identified. Note that FIG. 6 is a view showing an example of the setting screen 500 including setting items settable by a communication protocol.

Note that the database (FIG. 4) which indicates the relationship between the (types of) communication protocols and setting items settable by these communication protocols is stored in advance in the RAM 302 or HDD 304 of the control unit 30, as described above. Therefore, the CPU 301 extracts a plurality of different types of communication protocols from the plurality of pieces of destination information 230 input to the destination list 204, and refers to the database shown in FIG. 4. Then, the CPU 301 decides the setting items to be included in the setting screen 500 by merging the setting items settable by the plurality of different types of communication protocols.

Figure 7:
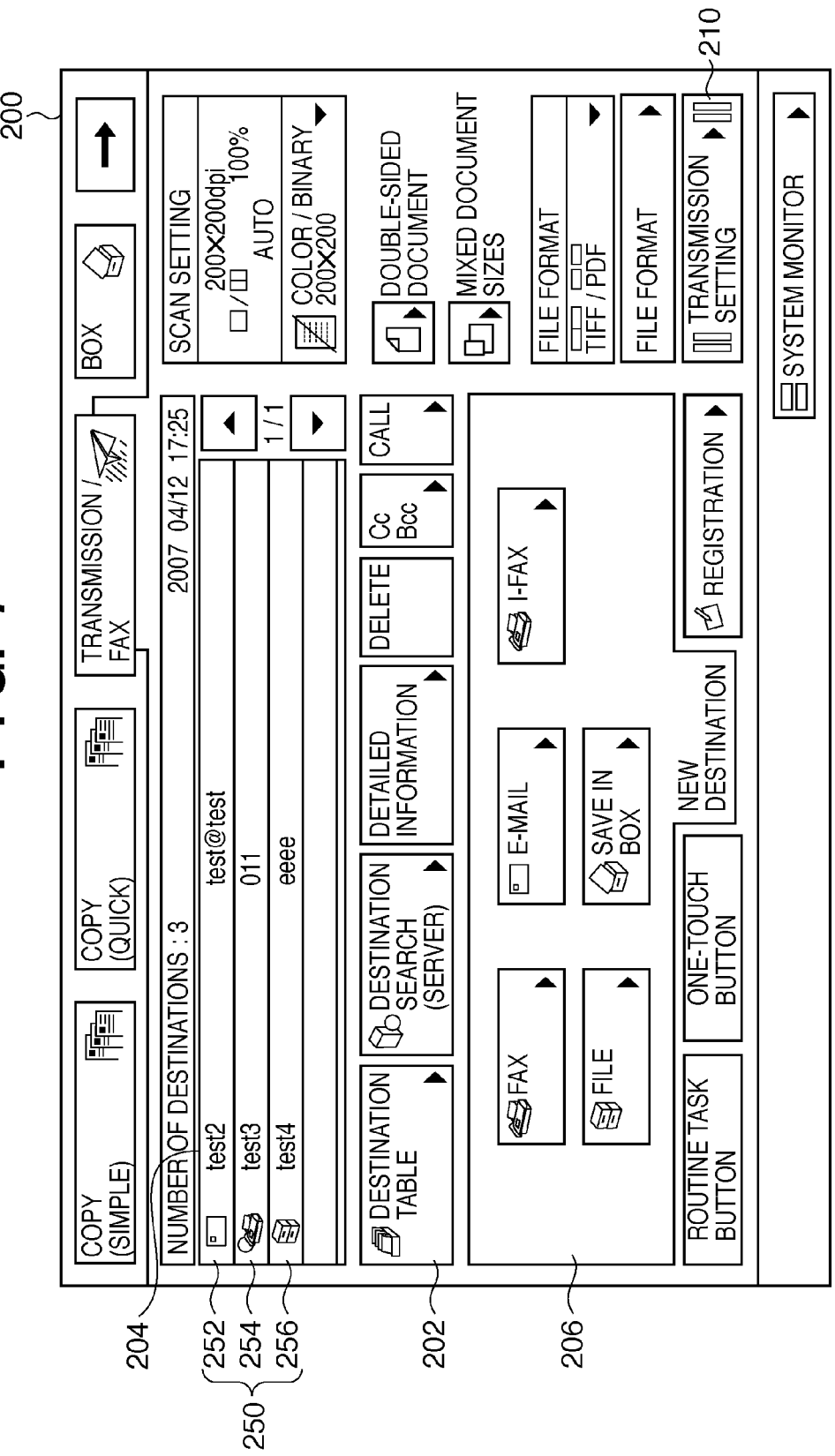
FIG. 7 is a view showing an example of a setting screen used to set (a destination as) a communication target of the communication apparatus shown in FIG. 1.

A case will be examined below wherein the user presses the transmission setting button 210 while a plurality of pieces of destination information 250 including a plurality of communication protocols, based on which the communication apparatus 1 can make communications, are input to the destination list 204 via the destination table 202 and/or new destination input field 206, as shown in FIG. 7. More specifically, the plurality of pieces of destination information 250 include destination information 252 which includes "test2" as a destination and "e-mail" as a communication protocol, and destination information 254 which includes "test3" as a destination and "I-FAX" as a communication protocol. Furthermore, the plurality of pieces of destination information 250 include destination information 256 which includes "test4" as a destination and "file" as a communication protocol. Note that FIG. 7 is a view showing an example of the setting screen 200 used to set (a destination as) a communication target of the communication apparatus 1.

Figure 8:
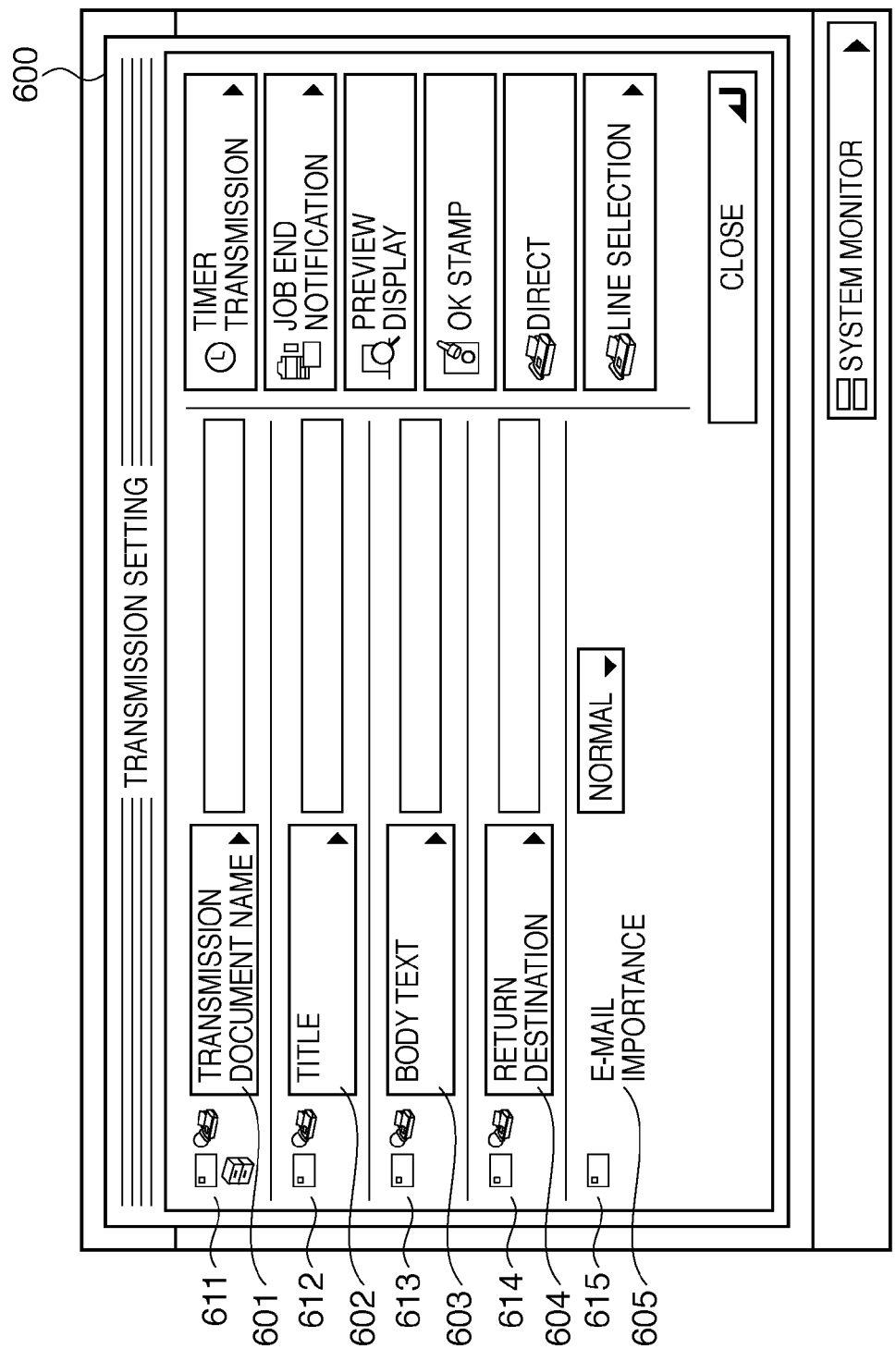
FIG. 8 is a view showing an example of a setting screen including setting items settable by a communication protocol.

In this case, a setting screen 600 including setting items obtained by merging those which are settable by a plurality of communication protocols included in the plurality of pieces of destination information 250 is generated, and is displayed on the operation unit 40, as shown in FIG. 8. The setting screen 600 includes a transmission document name 601, title 602, body text 603, return destination 604, and e-mail importance 605 as setting items obtained by merging those which are settable by the "e-mail", "I-FAX", and "file" communication protocols. Also, the setting screen 600 includes identifiers 611 to 615 used to identify the relations between each of the plurality of communication protocols ("e-mail", "I-FAX", and "file") and the setting items. For example, the identifier 611 identifies that the setting item of the transmission document name 601 relates to the "e-mail", "I-FAX", and "file" communication protocols (i.e., this setting item is settable by these communication protocols). The identifiers 612, 613, and 614 identify that the setting items of the title 602, body text 603, and return destination 604 relate to the "e-mail" and "I-FAX" communication protocols. The identifier 615 identifies that the setting item of the e-mail importance 605 relates to the "e-mail" communication protocol. Note that the identifiers 611 to 615 are icons which respectively express the plurality of communication protocols in this embodiment. However, these identifiers 611 to 615 may have any other forms as long as the relations between each of the plurality of communication protocols and the setting items can be identified. Note that FIG. 8 is a view showing an example of the setting screen 600 including setting items settable by a communication protocol.

Note that the database (FIG. 4) which indicates the relationship between the (types of) communication protocols and setting items settable by these communication protocols is stored in advance in the RAM 302 or HDD 304 of the control unit 30, as described above. Therefore, the CPU 301 extracts a plurality of different types of communication protocols from the plurality of pieces of destination information 250 input to the destination list 204, and refers to the database shown in FIG. 4. Then, the CPU 301 decides the setting items to be included in the setting screen 600 by merging the setting items settable by the plurality of different types of communication protocols.

Figure 9:
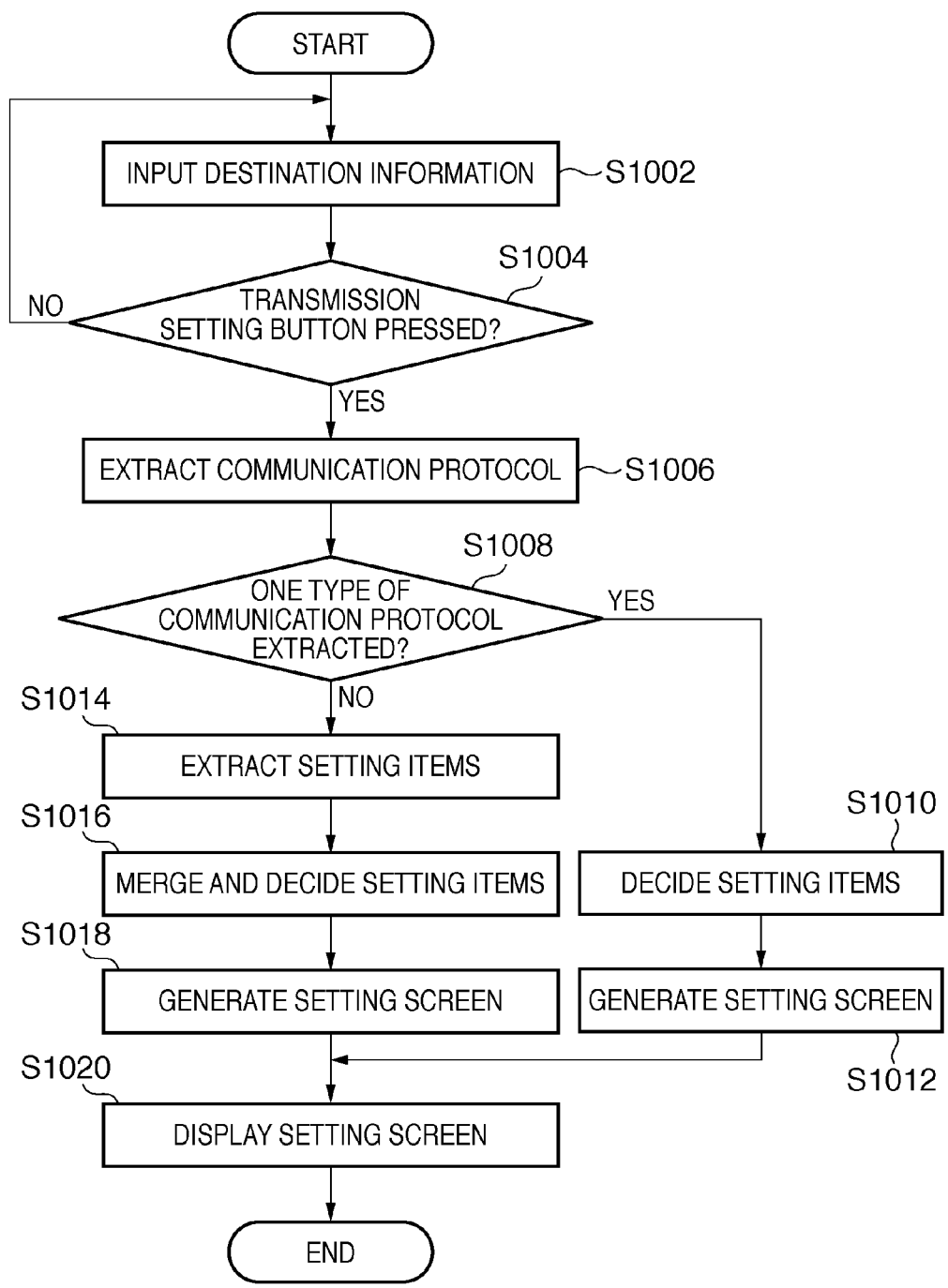
FIG. 9 is a flowchart showing processing for displaying a setting screen including setting items settable by a communication protocol in the first embodiment.

FIG. 9 is a flowchart showing the processing for displaying the aforementioned setting screen including setting items settable by communication protocols.

Referring to FIG. 9, the user inputs destination information to the destination list 204 via the destination table 202 or new destination input field 206 in step S1002.

The CPU 301 determines in step S1004 if the user presses (selects) the transmission setting button 210. If the CPU 301 determines that the user does not press the transmission setting button 210, the process returns to step S1002. On the other hand, if the CPU 301 determines that the user presses the transmission setting button 210, the process advances to step S1006.

In step S1006, the CPU 301 confirms the destination information input to the destination list 204 in step S1002, and extracts a communication protocol or communication protocols included in the destination information input to the destination list 204.

The CPU 301 determines in step S1008 if one type of communication protocol is extracted in step S1006. In other words, the CPU 301 determines in step S1008 if one type of communication protocol or a plurality of different types of communication protocols are extracted in step S1006.

If the CPU 301 determines that one type of communication protocol is extracted in step S1006, the process advances to step S1010.

In step S1010, the CPU 301 decides setting items to be included in the setting screen 400 based on the communication protocol extracted in step S1006 and the database (FIG. 4) indicating the relationship between the communication protocol and setting items settable by that communication protocol.

In step S1012, the CPU 301 generates the setting screen 400 including the setting items decided in step S1010.

On the other hand, if the CPU 301 determines that a plurality of different types of communication protocols are extracted in step S1006, the process advances to step S1014.

In step S1014, the CPU 301 extracts setting items which are respectively settable by the plurality of different types of communication protocols extracted in step S1006 based on the database (FIG. 4) indicating the relationship between the communication protocols and setting items settable by those communication protocols.

In step S1016, the CPU 301 decides setting items to be included in the setting screen 500 or 600 by merging the setting items extracted in step S1014.

In step S1018, the CPU 301 generates the setting screen 500 or 600 including the setting items decided in step S1016.

In step S1020, the CPU 301 displays the setting screen 400 generated in step S1012 or the setting screen 500 or 600 generated in step S1018 on the operation unit 40, thus ending the processing.

When the user selects a plurality of different types of communication protocols from a plurality of communication protocols, the communication apparatus 1 displays a setting screen including setting items obtained by merging those which are settable by these plurality of different types of communication protocols. In other words, the communication apparatus 1 provides the setting screen including the setting items required for the selected communication protocols to the user. Also, when the user selects a plurality of different types of communication protocols from a plurality of communication protocols, the communication apparatus 1 provides, to the user, a setting screen including identifiers used to identify the relations between the setting items and communication protocols (which of setting items influences which of communication protocols). In this manner, the communication apparatus 1 can provide a setting screen that can improve user's operability.

<Second Embodiment>

The second embodiment will explain processing for displaying a setting screen including setting items settable by a communication protocol based on selected one of pieces of destination information input to a destination list. This processing is executed when the CPU 301 systematically controls the respective units of the communication apparatus 1, as described above.

Figure 10:
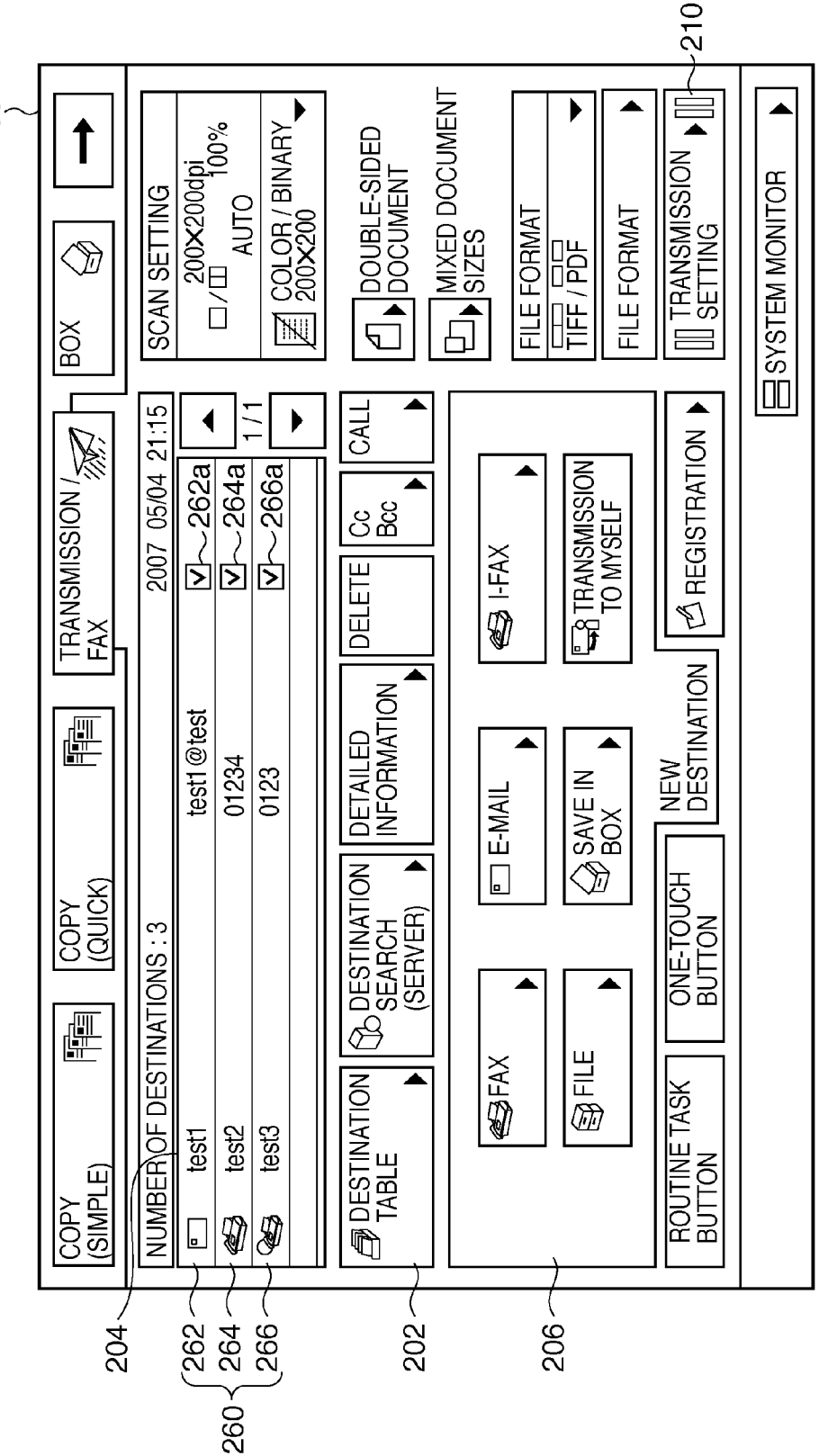
FIG. 10 is a view showing an example of a setting screen used to set (a destination as) a communication target of the communication apparatus shown in FIG. 1.

FIG. 10 is a view showing an example of a setting screen 200A used to set (a destination as) a communication target of the communication apparatus 1. The setting screen 200A is displayed on the operation unit 40.

On the setting screen 200A shown in FIG. 10, a plurality of pieces of destination information 260 including a plurality of communication protocols, based on which the communication apparatus 1 can make communications, are input to the destination list 204 via the destination table 202 and/or new destination input field 206. The plurality of pieces of destination information 260 include destination information 262 which includes "test1" as a destination and "e-mail" as a communication protocol, and destination information 264 which includes "test2" as a destination and "FAX" as a communication protocol. Furthermore, the plurality of pieces of destination information 260 include destination information 266 which includes "test3" as a destination and "I-FAX" as a communication protocol. Also, the setting screen 200A includes check boxes 262a, 264a, and 266a used to select the respective pieces of destination information 262, 264, and 266 input to the destination list 204. On the setting screen 200A shown in FIG. 10, all the pieces of destination information 262, 264, and 266 input to the destination list 204 are selected. Note that in this embodiment, when none of the plurality of pieces of destination information 260 input to the destination list 204 are selected, it is determined that all of the plurality of pieces of destination information 260 are selected.

Figure 11:
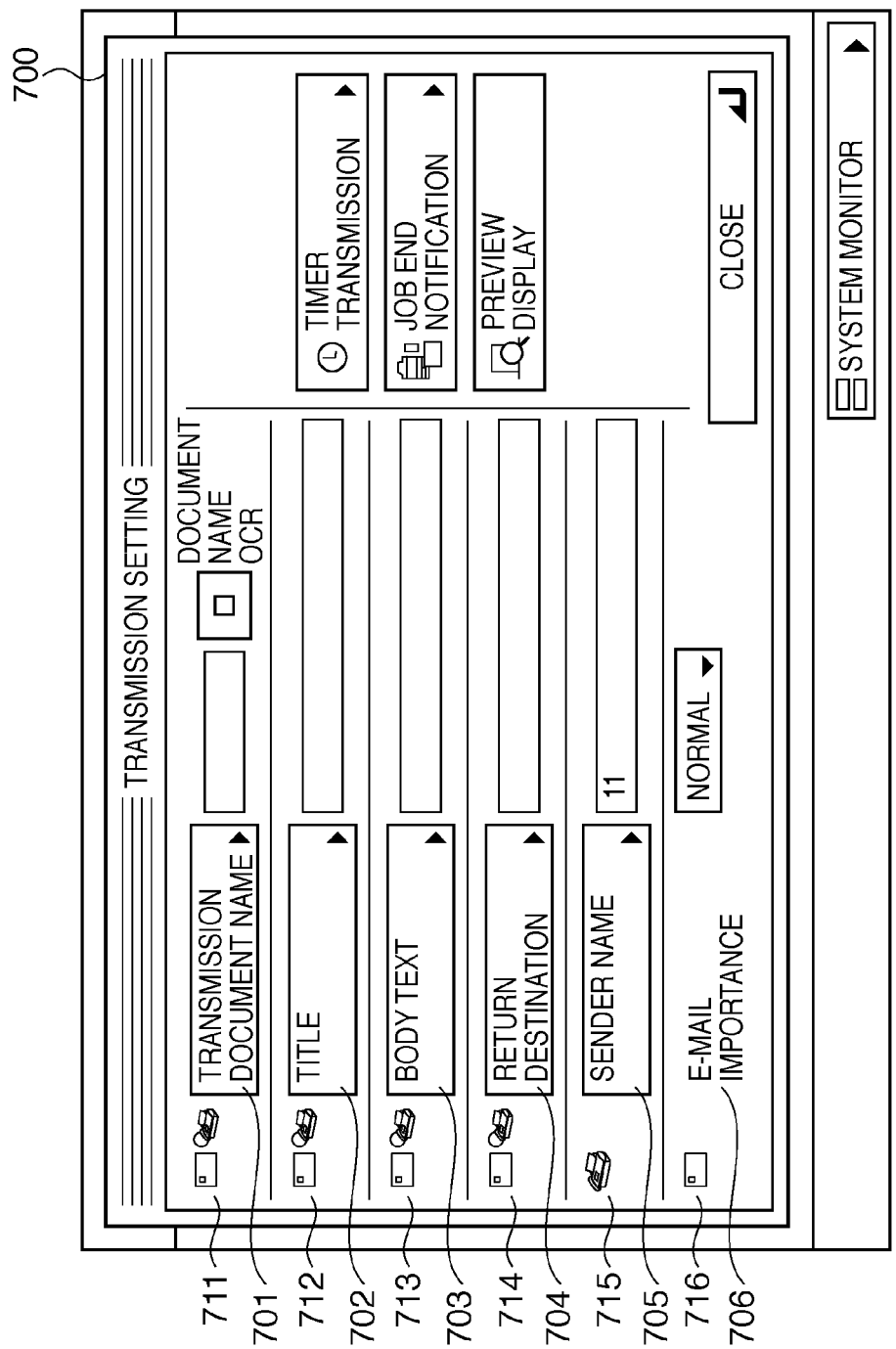
FIG. 11 is a view showing an example of a setting screen including setting items settable by a communication protocol.

When the user presses (selects) the transmission setting button 210 on the setting screen 200A shown in FIG. 10, a setting screen 700 of setting items used at the time of transmission is displayed on the operation unit 40, as shown in FIG. 11. When all of the plurality of pieces of destination information 260 input to the destination list 204 are selected (FIG. 10), the setting screen 700 including setting items obtained by merging those which are settable by the respective communication protocols included in the plurality of pieces of destination information 260 is generated. Note that FIG. 11 is a view showing an example of the setting screen 700 including setting items settable by a communication protocol.

The setting screen 700 includes a transmission document name 701, title 702, body text 703, return destination 704, sender name 705, and e-mail importance 706 as setting items obtained by merging those which are settable by the "e-mail", "FAX", and "I-FAX" communication protocols. Also, the setting screen 700 includes identifiers 711 to 716 used to identify the relations between each of the plurality of communication protocols ("e-mail", "FAX", and "I-FAX") and the setting items. For example, the identifier 711 identifies that the setting item of the transmission document name 701 relates to the "e-mail" and "I-FAX" communication protocols (i.e., this setting item is settable by these communication protocols). The identifiers 712, 713, and 714 identify that the setting items of the title 702, body text 703, and return destination 704 relate to the "e-mail" and "I-FAX" communication protocols. The identifier 715 identifies that the setting item of the sender name 705 relates to the "FAX" communication protocol. The identifier 716 identifies that the setting item of the e-mail importance 706 relates to the "e-mail" communication protocol. Note that the identifiers 711 to 716 are icons which respectively express the plurality of communication protocols in this embodiment. However, these identifiers 711 to 716 may have any other forms as long as the relations between the plurality of communication protocols and the setting items can be identified.

Note that the database (FIG. 4) which indicates the relationship between the (types of) communication protocols and setting items settable by these communication protocols is stored in advance in the RAM 302 or HDD 304 of the control unit 30, as in the first embodiment. Therefore, the CPU 301 extracts a plurality of different types of communication protocols from the pieces of selected destination information 262, 264, and 266 of the plurality of pieces of destination information 260 input to the destination list 204, and refers to the database shown in FIG. 4. Then, the CPU 301 decides the setting items to be included in the setting screen 700 by merging the setting items settable by the plurality of different types of communication protocols.

Figure 12:
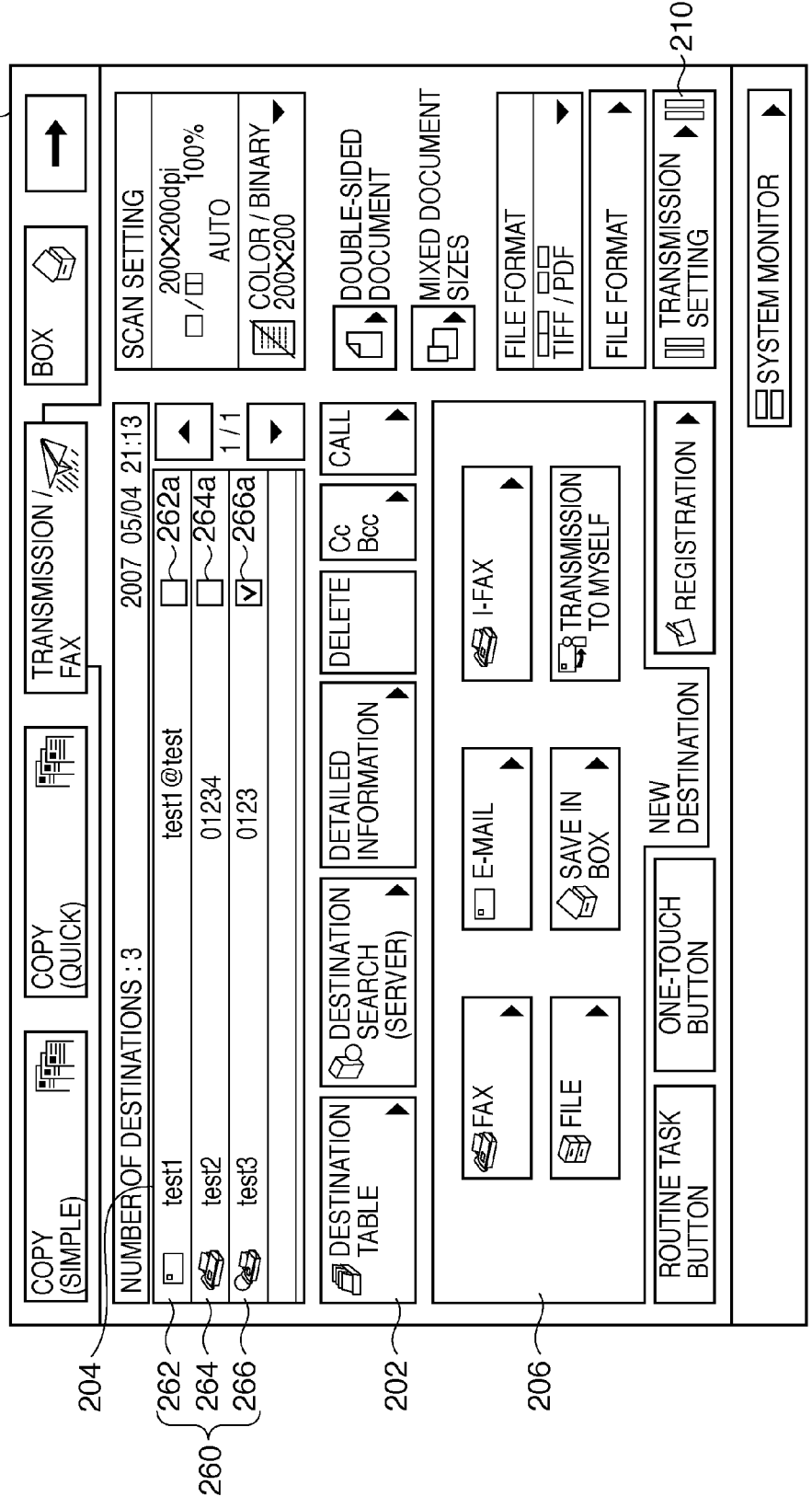
FIG. 12 is a view showing an example of a setting screen used to set (a destination as) a communication target of the communication apparatus shown in FIG. 1.

A case will be examined below wherein the user presses the transmission setting button 210 while he or she selects the destination information 266 of the plurality of pieces of destination information 260 input to the destination list 204, as shown in FIG. 12. FIG. 12 is a view showing an example of the setting screen 200A used to set (a destination as) a communication target of the communication apparatus 1.

Figure 13:
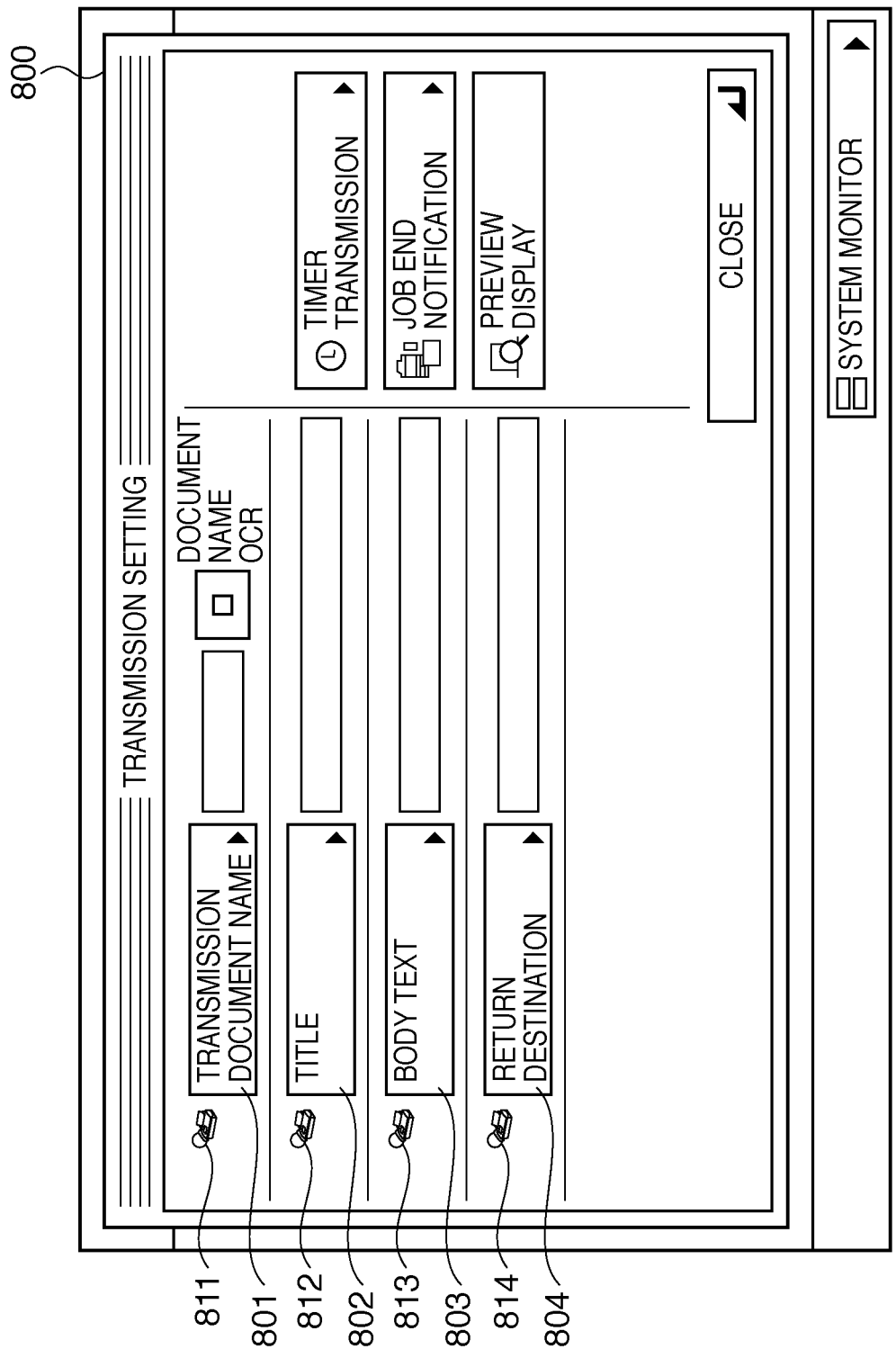
FIG. 13 is a view showing an example of a setting screen including setting items settable by a communication protocol.

In this case, as shown in FIG. 13, a setting screen 800 which includes setting items settable by the communication protocol ("I-FAX") included in the destination information 266 of the plurality of pieces of destination information 260 is generated and is displayed on the operation unit 40. The setting screen 800 includes a transmission document name 801, title 802, body text 803, and return destination 804 as setting items settable by the "I-FAX" communication protocol. Also, the setting screen 800 includes identifiers 811 to 814 used to identify that the setting items of the transmission document name 801, title 802, body text 803, and return destination 804 relate to the "I-FAX" communication protocol. Note that the identifiers 811 to 814 are icons which respectively express the plurality of communication protocols in this embodiment. However, these identifiers 811 to 814 may have any other forms as long as the relations between each of the plurality of communication protocols and the setting items can be identified. Note that FIG. 13 is a view showing an example of the setting screen 800 including setting items settable by a communication protocol.

Note that the database (FIG. 4) which indicates the relationship between the (types of) communication protocols and setting items settable by these communication protocols is stored in advance in the RAM 302 or HDD 304 of the control unit 30, as described above. Therefore, the CPU 301 extracts the type of communication protocol from the selected destination information 266 of the plurality of pieces of destination information 260 input to the destination list 204, and can decide the setting items to be included in the setting screen 800 with reference to the database shown in FIG. 4.

Figure 14:
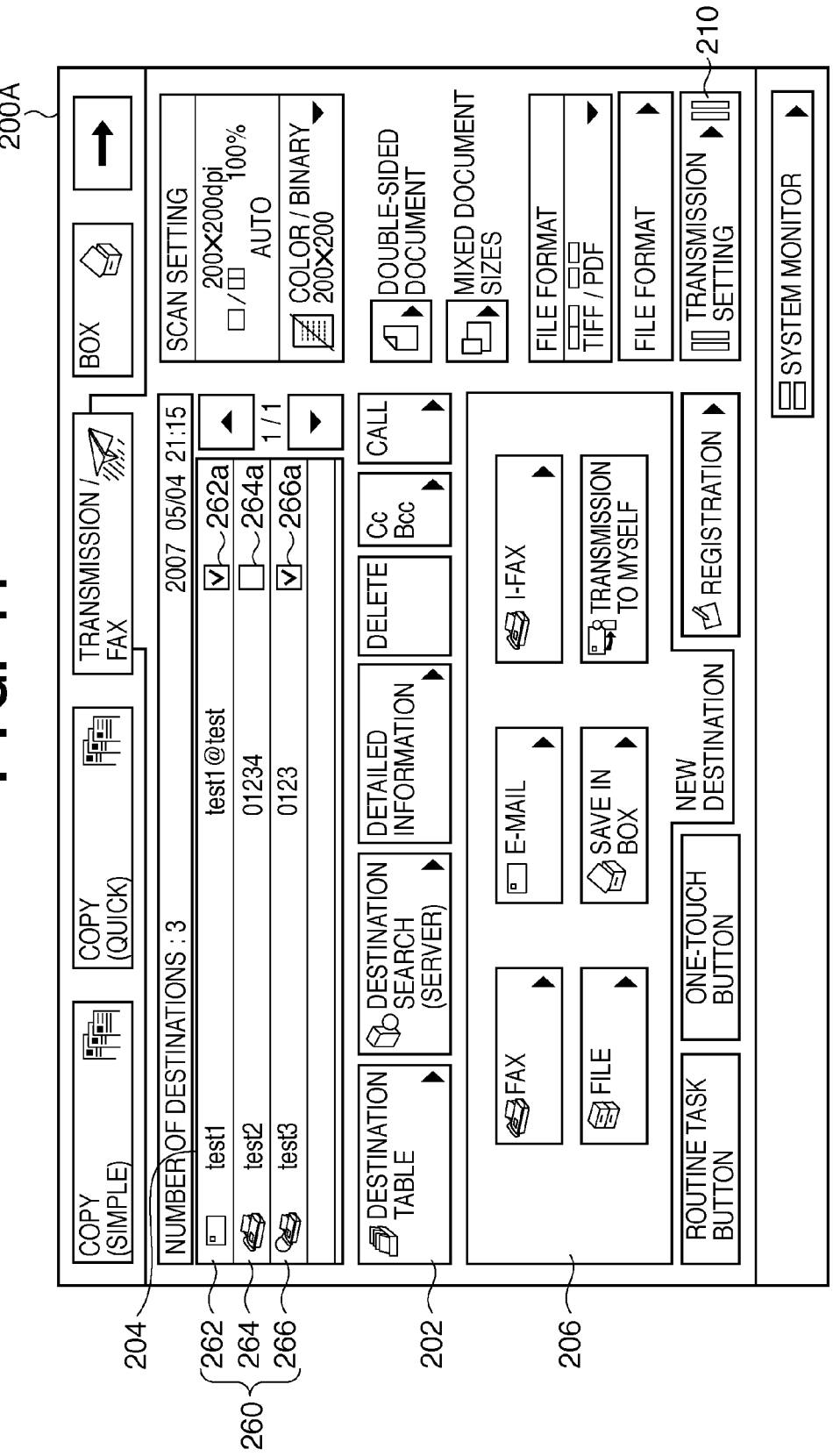
FIG. 14 is a view showing an example of a setting screen used to set (a destination as) a communication target of the communication apparatus shown in FIG. 1.

A case will be examined below wherein the user presses the transmission setting button 210 while he or she selects the two pieces of destination information 262 and 266 of the plurality of pieces of destination information 260 input to the destination list 204, as shown in FIG. 14. FIG. 14 is a view showing an example of the setting screen 200A used to set (a destination as) a communication target of the communication apparatus 1.

Figure 15:
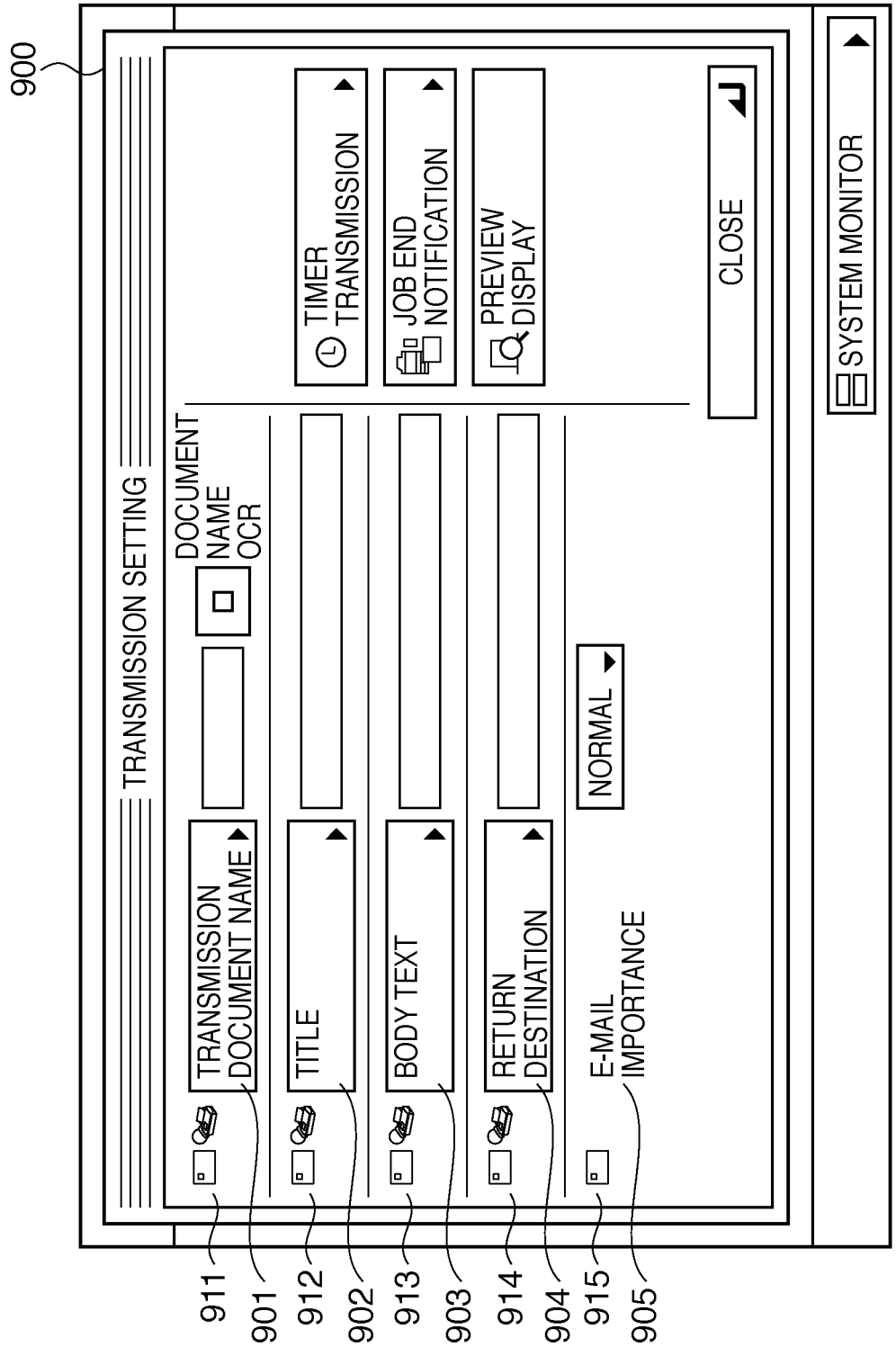
FIG. 15 is a view showing an example of a setting screen including setting items settable by a communication protocol.

In this case, as shown in FIG. 15, a setting screen 900 which includes setting items obtained by merging those which are settable by the respective communication protocols included in the two pieces of destination information 262 and 266 of the plurality of pieces of destination information 260 is generated and is displayed on the operation unit 40. More specifically, the setting screen 900 includes a transmission document name 901, title 902, body text 903, return destination 904, and e-mail importance 905 as setting items obtained by merging those which are settable by the "e-mail" and "I-FAX" communication protocols. Also, the setting screen 900 includes identifiers 911 to 915 used to identify the relations between each of the plurality of communication protocols ("e-mail" and "I-FAX") and the setting items. For example, the identifiers 911 to 914 identify that the setting items of the transmission document name 901, title 902, body text 903, and return destination 904 relate to the "e-mail" and "I-FAX" communication protocols. The identifier 915 identifies that the setting item of the e-mail importance 905 relates to the "e-mail" communication protocol. Note that the identifiers 911 to 915 are icons which respectively express the plurality of communication protocols in this embodiment. However, these identifiers 911 to 915 may have any other forms as long as the relations between each of the plurality of communication protocols and the setting items can be identified. Note that FIG. 15 is a view showing an example of the setting screen 900 including setting items settable by a communication protocol.

Note that the database (FIG. 4) which indicates the relationship between the (types of) communication protocols and setting items settable by these communication protocols is stored in advance in the RAM 302 or HDD 304 of the control unit 30, as described above. Therefore, the CPU 301 extracts a plurality of different types of communication protocols from the two pieces of destination information 262 and 266 selected from the plurality of pieces of destination information 260 input to the destination list 204, and refers to the database shown in FIG. 4. Then, the CPU 301 decides the setting items to be included in the setting screen 900 by merging the setting items settable by the plurality of different types of communication protocols.

Figure 16:
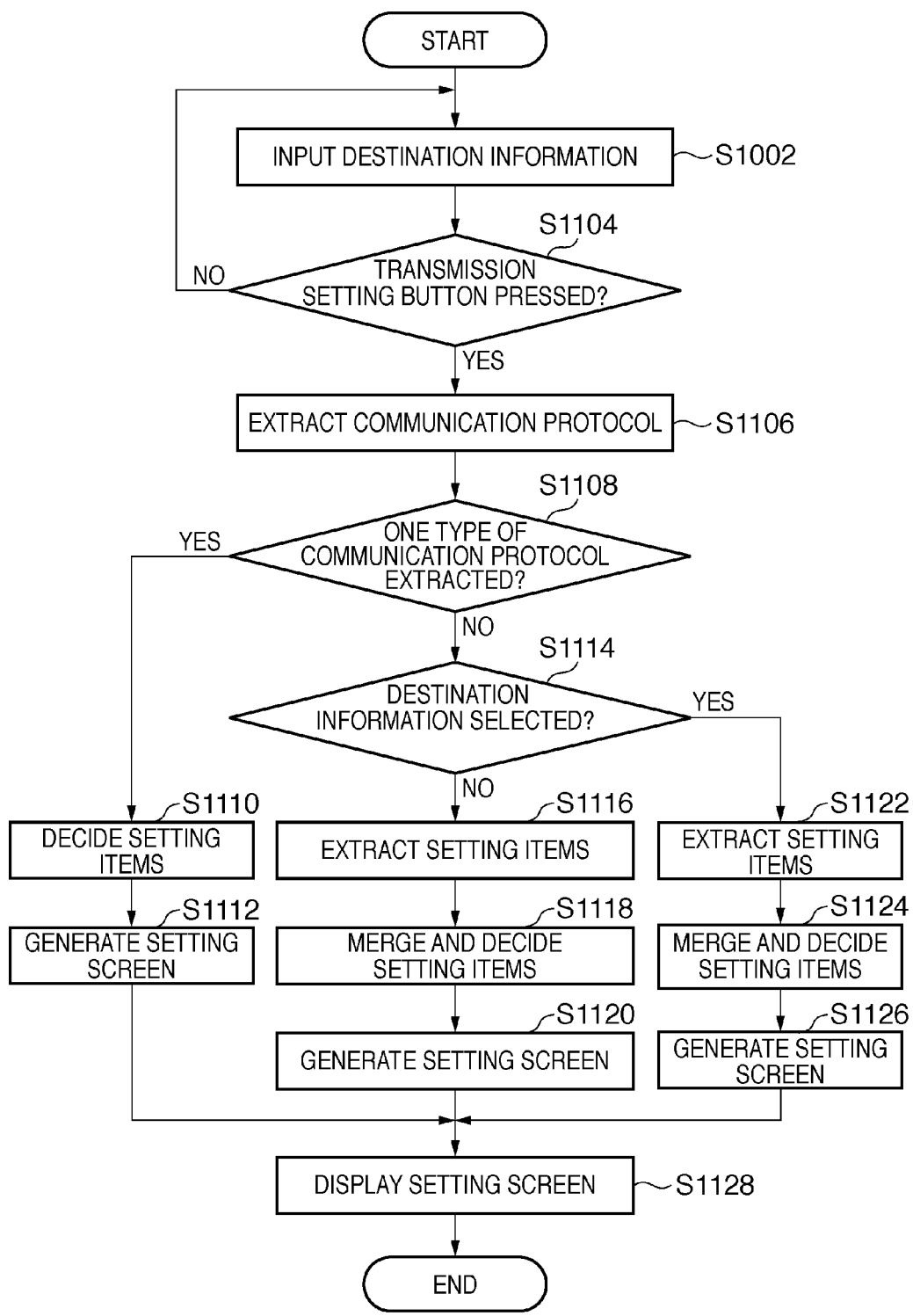
FIG. 16 is a flowchart showing processing for displaying a setting screen including setting items settable by a communication protocol in the second embodiment.

FIG. 16 is a flowchart showing the processing for displaying the aforementioned setting screen including setting items settable by the communication protocols.

Referring to FIG. 16, the user inputs destination information to the destination list 204 via the destination table 202 or new destination input field 206 in step S1102.

The CPU 301 determines in step S1104 if the user presses (selects) the transmission setting button 210. If the CPU 301 determines that the user does not press the transmission setting button 210, the process returns to step S1102. On the other hand, if the CPU 301 determines that the user presses the transmission setting button 210, the process advances to step S1106.

In step S1106, the CPU 301 confirms the destination information input to the destination list 204 in step S1102, and extracts a communication protocol or communication protocols included in the destination information input to the destination list 204.

The CPU 301 determines in step S1108 if one type of communication protocol is extracted in step S1106. In other words, the CPU 301 determines in step S1108 if one type of communication protocol or a plurality of different types of communication protocols are extracted in step S1106.

If the CPU 301 determines that one type of communication protocol is extracted in step S1106, the process advances to step S1110.

In step S1110, the CPU 301 decides setting items to be included in the setting screen 400 based on the communication protocol extracted in step S1106 and the database (FIG. 4) indicating the relationship between the communication protocol and setting items settable by that communication protocol.

In step S1112, the CPU 301 generates the setting screen 400 including the setting items decided in step S1110.

On the other hand, if the CPU 301 determines that a plurality of different types of communication protocols are extracted in step S1106, the process advances to step S1114.

The CPU 301 determines in step S1114 if the user selects destination information input to the destination list 204 in step S1102.

If the CPU 301 determines that the user does not select any destination information input to the destination list 204 in step S1102, the process advances to step S1116.

In step S1116, the CPU 301 extracts setting items which are respectively settable by the plurality of different types of communication protocols extracted in step S1106 based on the database (FIG. 4) indicating the relationship between the communication protocols and setting items settable by those communication protocols.

In step S1118, the CPU 301 decides setting items to be included in the setting screen 700 by merging the setting items extracted in step S1116.

In step S1120, the CPU 301 generates the setting screen 700 including the setting items decided in step S1118.

On the other hand, if the CPU 301 determines that the user selects destination information input to the destination list 204 in step S1102, the process advances to step S1122.

In step S1122, the CPU 301 extracts setting items which are respectively settable by the destination information selected from those input to the destination list 204 based on the database (FIG. 4) indicating the relationship between the communication protocols and setting items settable by those communication protocols.

In step S1124, the CPU 301 decides setting items to be included in the setting screen 800 or 900 by merging the setting items extracted in step S1122. Note that when the user selects only one of the pieces of destination information input to the destination list 204, the CPU 301 need not merge the setting items, and decides the setting items settable by the communication protocol of the one destination information as those to be included in the setting screen 800.

In step S1126, the CPU 301 generates the setting screen 800 or 900 including the setting items decided in step S1124.

In step S1128, the CPU 301 displays the setting screen 400 generated in step S1112, the setting screen 700 generated in step S1120, or the setting screen 800 or 900 generated in step S1126 on the operation unit 40, thus ending the processing.

When the user selects pieces of destination information from a plurality of pieces of destination information input to the destination list, the communication apparatus 1 displays a setting screen including setting items obtained by merging those which are settable by respective communication protocols included in the selected pieces of destination information. In other words, the communication apparatus 1 provides a setting screen including setting items required for the selected communication protocols to the user. On the other hand, when the user selects pieces of destination information from a plurality of pieces of destination information input to the destination list, the communication apparatus 1 provides, to the user, a setting screen including identifiers used to identify the relations between the setting items and communication protocols (which of setting items influences which of communication protocols). In this manner, the communication apparatus 1 can provide a setting screen that can improve user's operability.

<Third Embodiment>

The third embodiment will explain processing for changing, when the user selects a setting item on a setting screen used to set (a destination as) a communication target of the communication apparatus 1, display of destination information input to a destination list based on the selected setting item. This processing is executed when the CPU 301 systematically controls the respective units of the communication apparatus 1, as described above.

Figure 17:
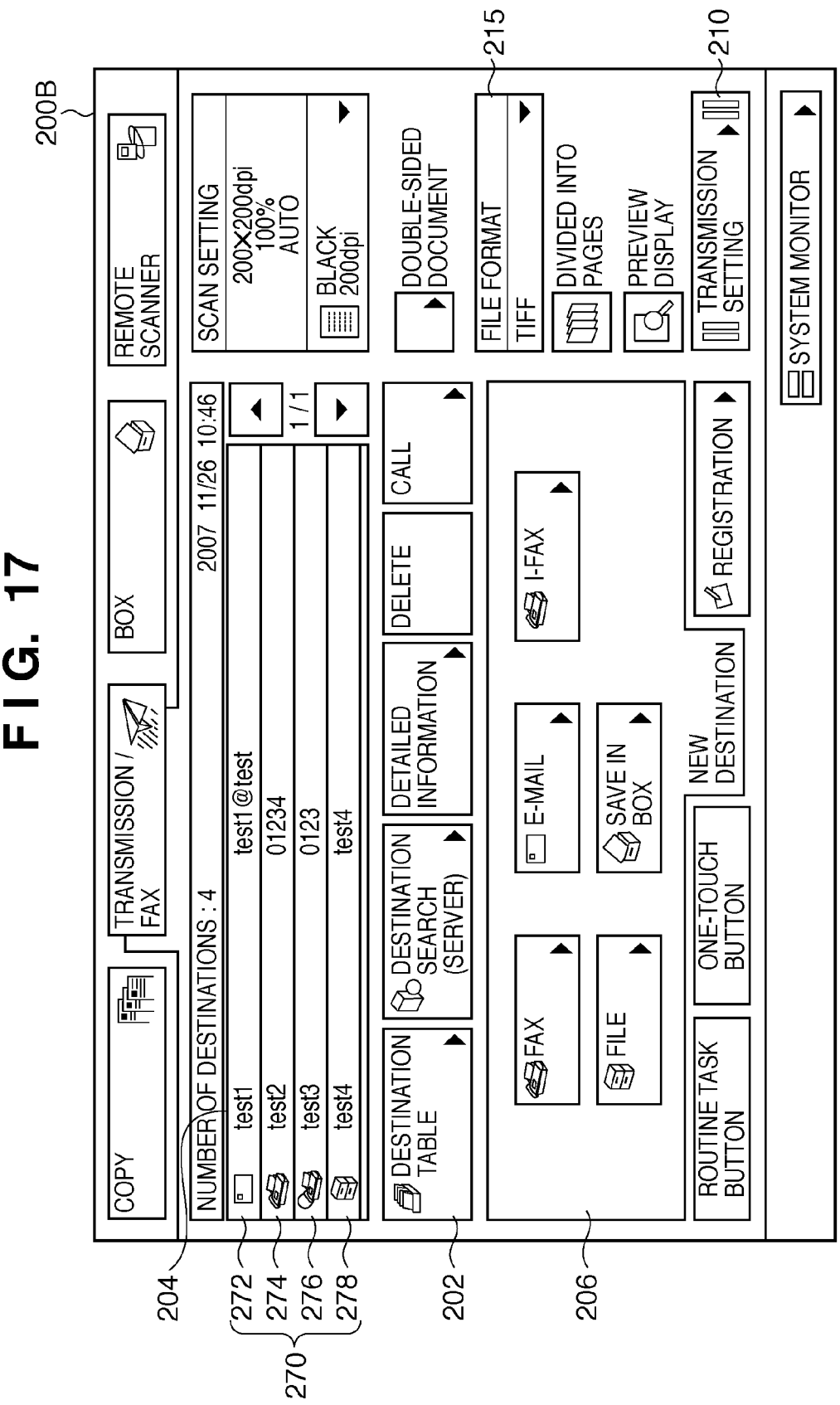
FIG. 17 is a view showing an example of a setting screen used to set (a destination as) a communication target of the communication apparatus shown in FIG. 1.

FIG. 17 is a view showing an example of a setting screen 200B used to set (a destination as) a communication target of the communication apparatus 1. The setting screen 200B is displayed on the operation unit 40.

On the setting screen 200B shown in FIG. 17, a plurality of pieces of destination information 270 including a plurality of communication protocols, based on which the communication apparatus 1 can make communications, are input to the destination list 204 via the destination table 202 and/or new destination input field 206. More specifically, the plurality of pieces of destination information 270 include destination information 272 which includes "test1" as a destination and "e-mail" as a communication protocol, and destination information 274 which includes "test2" as a destination and "FAX" as a communication protocol. Furthermore, the plurality of pieces of destination information 270 include destination information 276 which includes "test3" as a destination and "I-FAX" as a communication protocol, and destination information 278 which includes "test4" as a destination and "file" as a communication protocol.

Figure 18:
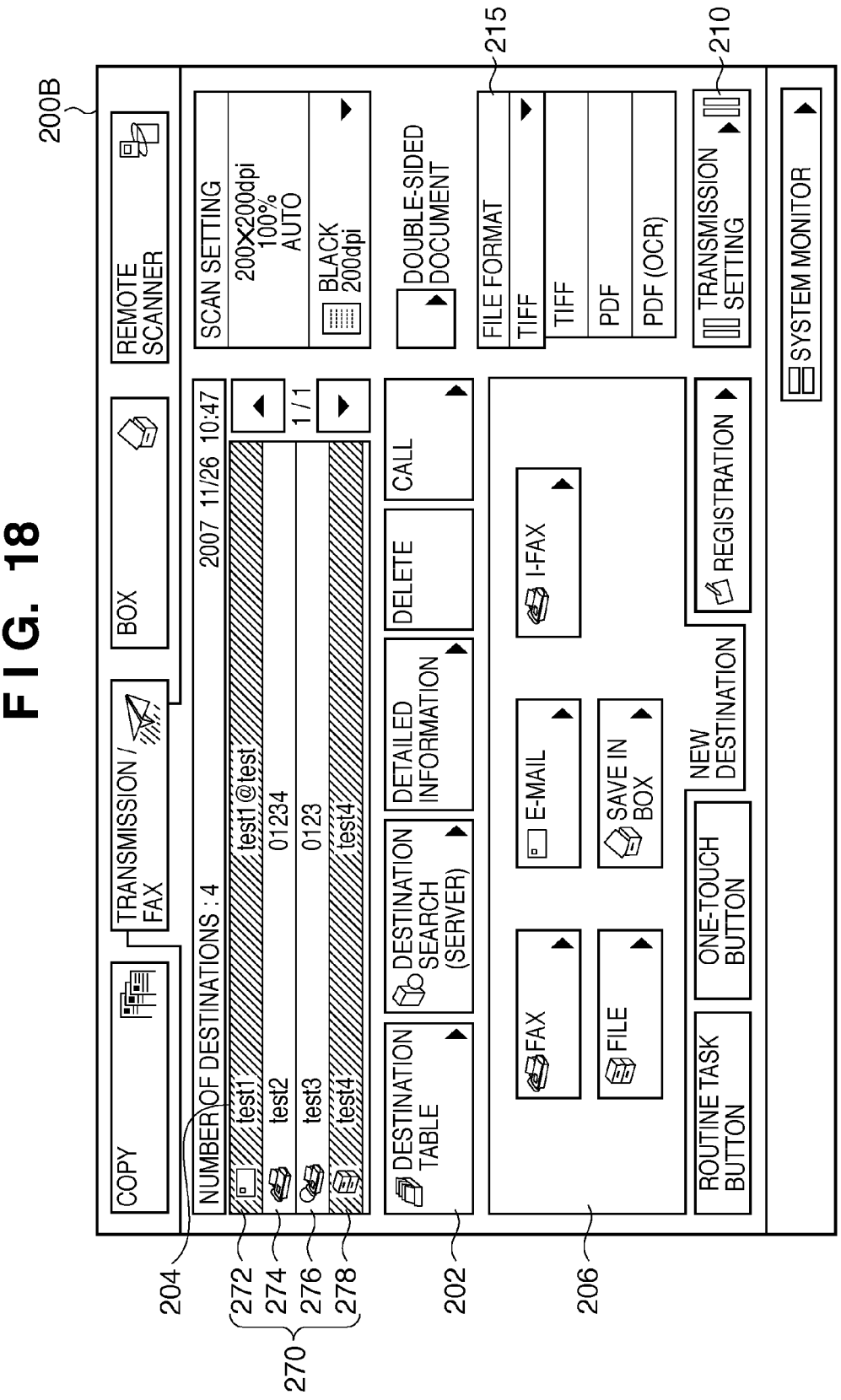
FIG. 18 is a view showing an example of a setting screen used to set (a destination as) a communication target of the communication apparatus shown in FIG. 1.

A case will be examined below wherein the user selects (presses) a file format setting button 215 as a setting item on the setting screen 200B shown in FIG. 17. In this case, as shown in FIG. 18, the CPU 301 controls display of destination information so as to allow the user to identify communication protocols which relate to the setting item selected on the setting screen 200B, and those which do not relate to the selected setting item of the plurality of pieces of destination information 270 input to the destination list 204. More specifically, the CPU 301 controls display of the plurality of pieces of destination information 270 input to the destination list 204 so as to highlight the destination information 272 including "e-mail" and the destination information 278 including "file" as communication protocols which relate to the file format setting. Note that FIG. 18 is a view showing an example of the setting screen 200B used to set (a destination as) a communication target of the communication apparatus 1.

Figure 19:
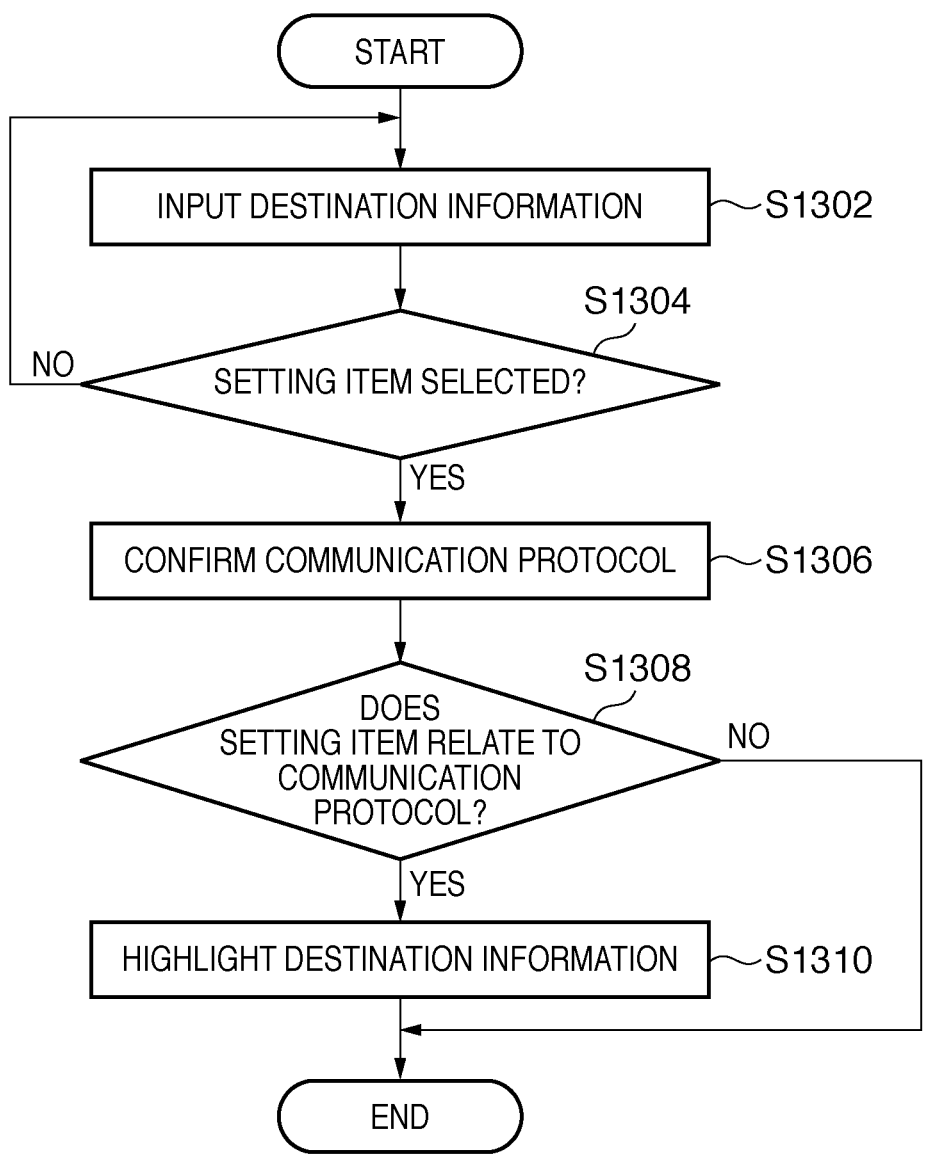
FIG. 19 is a flowchart showing the processing for controlling display of a plurality of pieces of destination information input to a destination list on the setting screens shown in FIGS. 17 and 18.

FIG. 19 is a flowchart showing the processing for controlling display of the plurality of pieces of destination information 270 input to the destination list 204 on the aforementioned setting screen 200B.

Referring to FIG. 19, the user inputs destination information to the destination list 204 via the destination table 202 or new destination input field 206 in step S1302.

The CPU 301 determines in step S1304 if the user selects a setting item (for example, the file format setting button 215) on a setting screen (for example, the setting screen 200B) used to set (a destination as) a communication target of the communication apparatus 1. If the CPU 301 determines that the user does not select any setting item, the process returns to step S1302. On the other hand, if the CPU 301 determines that the user selects a setting item, the process advances to step S1306.

In step S1306, the CPU 301 confirms a communication protocol of the destination information input to the destination list 204 in step S1302. In this case, the CPU 301 also confirms setting items settable by the communication protocol with reference to the database (FIG. 4) indicating the relationship between the communication protocols and setting items settable by those communication protocols.

The CPU 301 determines in step S1308 if the setting item selected on the setting screen used to set a communication target of the communication apparatus 1 relates to the communication protocol confirmed in step S1306.

If the setting item selected on the setting screen used to set a communication target of the communication apparatus 1 does not relate to any communication protocol confirmed in step S1306, the CPU 301 ends the processing. On the other hand, if the setting item selected on the setting screen used to set a communication target of the communication apparatus 1 relates to the communication protocol confirmed in step S1306, the process advances to step S1310.

In step S1310, the CPU 301 highlights destination information including the communication protocol related to the setting item selected on the setting screen used to set a communication target of the communication apparatus 1 of those input to the destination list 204, thus ending the processing.

In this embodiment, the CPU 301 highlights destination information including a communication protocol related to the setting item selected on the setting screen used to set a communication target of the communication apparatus 1. However, the present invention is not limited to this. For example, check boxes may be provided to pieces of destination information input to the destination list, and the CPU 301 may check the check box of destination information including a communication protocol related to the setting item selected on the setting screen.

Figure 20:
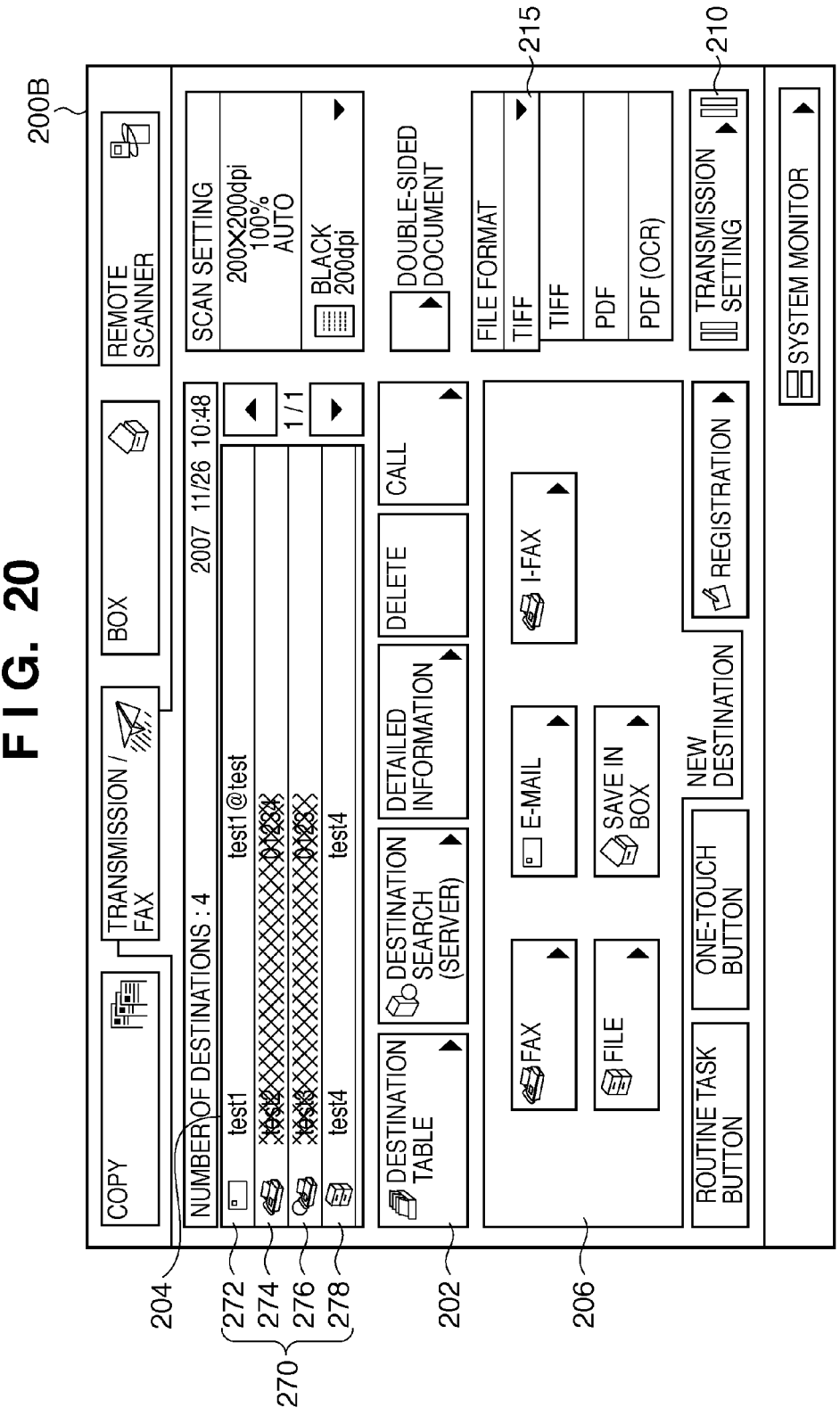
FIG. 20 is a view showing an example of a setting screen used to set (a destination as) a communication target of the communication apparatus shown in FIG. 1.
Figure 21:
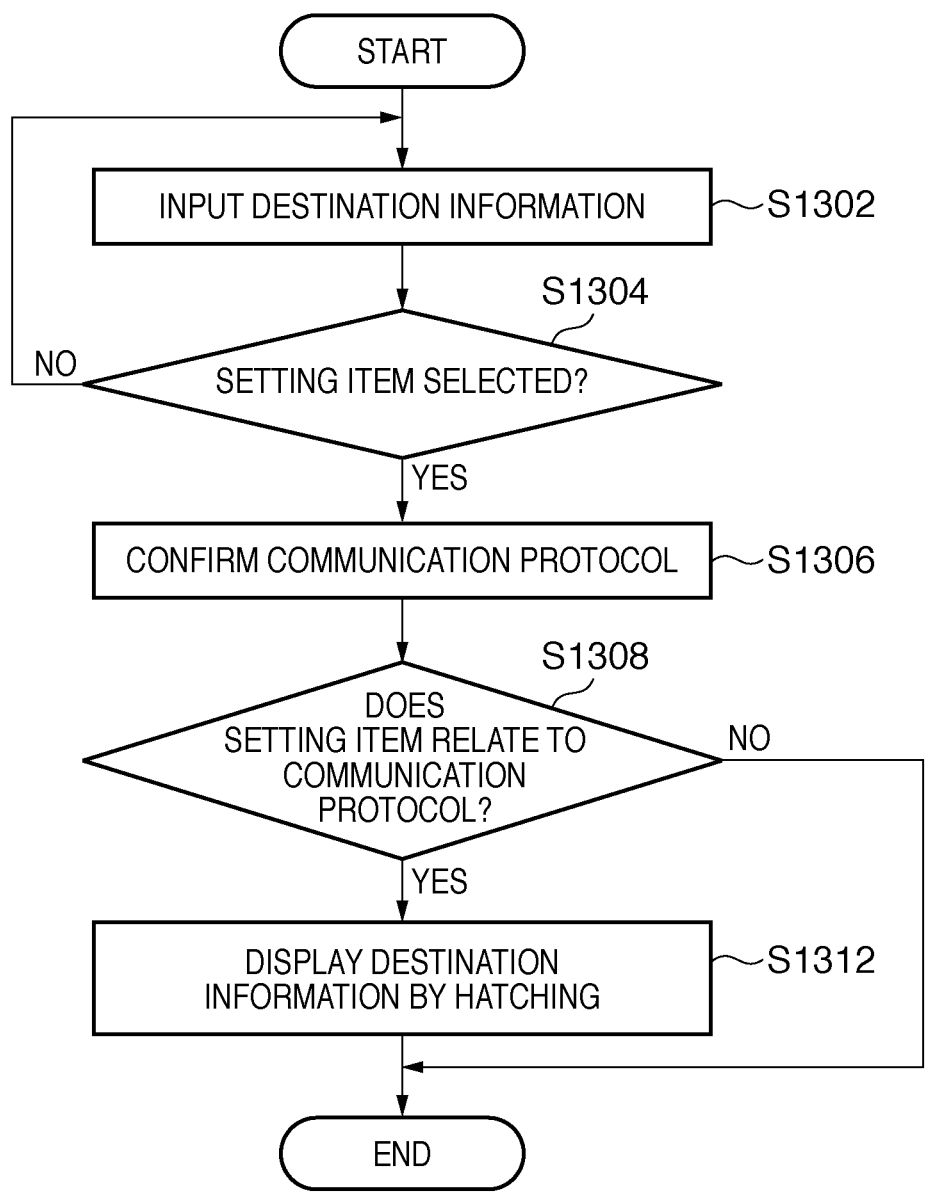
FIG. 21 is a flowchart showing the processing for controlling display of a plurality of pieces of destination information input to a destination list on the setting screens shown in FIGS. 17 and 18.

Alternatively, as shown in FIG. 20, the CPU 301 may display, by hatching, the destination information 274 including "FAX" and the destination information 276 including "I-FAX" as communication protocols which do not relate to the setting item selected on the setting screen 200B. In this way, the CPU 301 can control display of destination information so as to allow the user to identify communication protocols which relate to the setting item selected on the setting screen 200B from those which do not relate to the selected setting item. In this case, as shown in FIG. 21, step S1310 shown in FIG. 19 may be replaced by step S1312. More specifically, in step S1312, the CPU 301 displays, by hatching, destination information including a communication protocol which is not related to the setting item selected on the setting screen used to set a communication target of the communication apparatus 1 of those input to the destination list 204, thus ending the processing. Note that FIG. 20 is a view showing an example of the setting screen 200B used to set (a destination as) a communication target of the communication apparatus 1. FIG. 21 is a flowchart showing the processing for controlling display of the plurality of pieces of destination information 270 input to the destination list 204 on the aforementioned setting screen 200B.

The communication apparatus 1 displays a communication protocol included in destination information of the plurality of pieces of destination information 270 input to the destination list 204, to which the setting item selected on the setting screen 200B relates or does not relate in an easy-to-understand manner for the user. In this manner, the communication apparatus 1 can provide a setting screen that can improve user's operability.

In the example of the above description, a destination setting apparatus (for example, the operation unit 40) having a destination setting function is equipped as a part of the communication apparatus 1. Alternatively, the present invention may be applied to an embodiment other than the aforementioned embodiments. That is, an apparatus independent of the communication apparatus 1 having an actual communication function may have the aforementioned destination setting function, and by inputting destination information and detailed settings set by this apparatus to the communication apparatus 1, the communication apparatus 1 may execute communications.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

Note that the present invention is not limited to a setting screen displayed upon pressing of the transmission setting button, but it is applicable to screens displayed upon pressing of other buttons, screens used to confirm settings, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2009-002915 filed on Jan. 8, 2009, which is hereby incorporated by reference herein in its entirety.

What is claimed is:

1. A destination setting apparatus for setting destinations used in communications based on a plurality of communication protocols, the apparatus comprising:
an input unit configured to input destination information including a destination and a communication protocol of the destination to a destination list which displays a destination as a communication target;
a display unit configured to display a setting screen including setting items settable by each communication protocol, based on the destination information input to the destination list;
a determination unit configured to determine if the destination information input to the destination list includes one type of communication protocol or a plurality of different types of communication protocols; and
a control unit configured to control to generate a setting screen to be displayed by the display unit based on the determination result of the determination unit, and to display the setting screen on the display unit,
wherein when the determination unit determines that the destination information input to the destination list includes one type of communication protocol, the control unit generates a setting screen including setting items settable by the one type of communication protocol, and
when the determination unit determines that the destination information input to the destination list includes a plurality of different types of communication protocols, the control unit generates a setting screen including setting items obtained by merging setting items settable by the plurality of different types of communication protocols, and
wherein at least one of the input unit, the display unit, the determination unit, or the control unit is implemented by a processor and a memory.

2. The apparatus according to claim 1, further comprising:
a selection unit configured to select destination information input to the destination list; and
a judging unit configured to judge, when the determination unit determines that the destination information input to the destination list includes a plurality of different types of communication protocols, if the selection unit selects destination information,
wherein when the judging unit judges that the selection unit does not select any destination information, the control unit generates a setting screen including setting items obtained by merging setting items settable by all of the plurality of different types of communication protocols included in the destination information input to the destination list, and
when the judging unit judges that the selection unit selects destination information, the control unit generates a setting screen including setting items obtained by merging setting items settable by communication protocols included in the destination information selected by the selection unit.

3. The apparatus according to claim 1, wherein the control unit generates the setting screen including identifiers used to identify relations between each of a plurality of different types of communication protocols and setting items.

4. The apparatus according to claim 1, wherein the input unit selects destination information from a plurality of pieces of destination information which are registered in advance, and inputs the selected destination information to the destination list.

5. The apparatus according to claim 1, wherein the input unit generates new destination information, and inputs the generated destination information to the destination list.

6. A method of controlling a destination setting apparatus for setting destinations used in communications based on a plurality of communication protocols, the method comprising the steps of:
inputting destination information including a destination and a communication protocol of the destination to a destination list which displays a destination as a communication target;
displaying, on a display unit, a setting screen including setting items settable by each communication protocol, based on the destination information input to the destination list;
determining if the destination information input to the destination list includes one type of communication protocol or a plurality of different types of communication protocols; and
controlling to generate a setting screen to be displayed by the display unit based on the determination result in the determining step, and to display the setting screen on the display unit,
wherein in the controlling step, when it is determined in the determining step that the destination information input to the destination list includes one type of communication protocol, a setting screen including setting items settable by the one type of communication protocol is generated, and
when it is determined in the determining step that the destination information input to the destination list includes a plurality of different types of communication protocols, a setting screen including setting items obtained by merging setting items settable by the plurality of different types of communication protocols is generated.

7. A non-transitory computer-readable recording medium which records a program for making a computer execute a method of controlling a destination setting apparatus for setting destinations used in communications based on a plurality of communication protocols, the program making the computer execute the steps of:
- inputting destination information including a destination and a communication protocol of the destination to a destination list which displays a destination as a communication target;
- displaying, on a display unit, a setting screen including setting items settable by each communication protocol, based on the destination information input to the destination list;
- determining if the destination information input to the destination list includes one type of communication protocol or a plurality of different types of communication protocols; and
- controlling to generate a setting screen to be displayed by the display unit based on the determination result in the determining step, and to display the setting screen on the display unit,
- wherein in the controlling step, when it is determined in the determining step that the destination information input to the destination list includes one type of communication protocol, a setting screen including setting items settable by the one type of communication protocol is generated, and
- when it is determined in the determining step that the destination information input to the destination list includes a plurality of different types of communication protocols, a setting screen including setting items obtained by merging setting items settable by the plurality of different types of communication protocols is generated.

8. A destination setting apparatus for setting destinations used in communications based on a plurality of communication protocols, the apparatus comprising:
- a designating unit configured to designate a plurality of destinations;
- a first determination unit configured to determine a plurality of communication protocols respectively corresponding to the plurality of destinations designated by the designating unit;
- a second determination unit configured to determine a setting item which is settable by each of the plurality of communication protocols determined by the first determination unit; and
- a display unit configured to display, based on a result of the determination by the second determination unit, a setting screen which includes a first setting item and does not include a second setting item, wherein the first setting item is settable by a communication protocol corresponding to at least one of the plurality of destinations designated by the designating unit, the second setting item is not settable by communication protocols corresponding to any of the plurality of destinations designated by the designating unit, and the second setting item is settable by another communication protocol included in the plurality of communication protocols,
- wherein at least one of the designating unit, the determination unit, the first display unit, the second determination unit, and is implemented by a processor and a memory.

9. A destination setting apparatus for setting destinations used in communications based on a plurality of communication protocols, the apparatus comprising:
- a designating unit configured to designate a plurality of destinations;
- a first determination unit configured to determine a plurality of communication protocols respectively corresponding to the plurality of destinations designated by the designating unit;
- a second determination unit configured to determine a setting item which is settable by each of the plurality of communication protocols determined by the first determination unit; and
- a display unit configured to display, based on a result of the determination by the second determination unit, a setting screen so that a first setting item is distinguishable from a second setting item, wherein the first setting item is settable by a communication protocol corresponding to at least one of the plurality of destinations designated by the designating unit, the second setting item is not settable by communication protocols corresponding to any of the plurality of destinations designated by the designating unit, and the second setting item is settable by another communication protocol included in the plurality of communication protocols,
- wherein at least one of the designating unit, the determination unit, the first display unit, the second determination unit, and is implemented by a processor and a memory.

10. A method of controlling a destination setting apparatus for setting destinations used in communications based on a plurality of communication protocols, the method comprising:
- a designating step of designating a plurality of destinations;
- a first determination step of determining a plurality of communication protocols respectively corresponding to the plurality of destinations designated in the designating step;
- a second determination step of determining a setting item which is settable by each of the plurality of communication protocols determined in the first determination step;
- a displaying step of displaying, based on a result of the determination in the second determination step, a setting screen which includes a first setting item and does not include a second setting item, wherein the first setting item is settable by a communication protocol corresponding to at least one of the plurality of destinations designated in the designating step, the second setting item is not settable by communication protocols corresponding to any of the plurality of destinations designated in the designating step, and the second setting item is settable by another communication protocol included in the plurality of communication protocols.

11. A method of controlling a destination setting apparatus for setting destinations used in communications based on a plurality of communication protocols, the method comprising:
- a designating step of designating a plurality of destinations;
- a first determination step of determining a plurality of communication protocols respectively corresponding to the plurality of destinations designated in the designating step;
- a second determination step of determining a setting item which is settable by each of the plurality of communication protocols determined in the first determination step; and a displaying step of displaying, based on a result of the determination of the second determining step, a setting screen so that a first setting item is distinguishable from a second setting item, wherein the first setting item is settable by a communication protocol corresponding to at least one of the plurality of destinations designated in the designating step, the second setting item is not settable by communication protocols corresponding to any of the plurality of destinations designated in the designating step, and the second setting item is settable by another communication protocol included in the plurality of communication protocols.

12. A non-transitory computer-readable recording medium which records a program for making a computer execute a method of controlling a destination setting apparatus for setting destinations used in communications based on a plurality of communication protocols, the program making the computer execute:

a designating step of designating a plurality of destinations;
  a first determination step of determining a plurality of communication protocols respectively corresponding to the plurality of destinations designated in the designating step;
  a second determination step of determining a setting item which is settable by each of the plurality of communication protocols determined in the first determination step; and
  a displaying step of displaying, based on a result of the determination in the second determining step, a setting screen which includes a first setting item and does not include a second setting item, wherein the first setting item is settable by a communication protocol corresponding to at least one of the plurality of destinations designated in the designating, the second setting item is not settable by communication protocols corresponding to any of the plurality of destinations designated in the designating step, and the second setting item is settable by another communication protocol included in the plurality of communication protocols.

13. A non-transitory computer-readable recording medium which records a program for making a computer execute a method of controlling a destination setting apparatus for setting destinations used in communications based on a plurality of communication protocols, the program making the computer execute:

a designating step of designating a plurality of destinations;
  a first determination step of determining a plurality of communication protocols respectively corresponding to the plurality of destinations designated in the designating step;
  a second determination step of determining a setting item which is settable by each of the plurality of communication protocols determined in the first determination step; and
  a displaying step of displaying, based on a result of the determination in the second determining step, a setting screen, so that a first setting item is distinguishable from a second setting item, wherein the first setting item is settable by a communication protocol corresponding to at least one of the plurality of destinations designated in the designating step, the second setting item is not settable by communication protocols corresponding to any of the plurality of destinations designated in the designating step, and the second setting item is settable by another communication protocol included in the plurality of communication protocols.

* * * * *